United States Patent
Thangarasa et al.

(10) Patent No.: US 12,048,002 B2
(45) Date of Patent: Jul. 23, 2024

(54) ADAPTING UE SERVING CELL PROCEDURES BASED ON DL CCA OPERATIONAL INFORMATION

(71) Applicant: TELEFONAKTIEBOLAGET LM ERICSSON (PUBL), Stockholm (SE)

(72) Inventors: Santhan Thangarasa, Vällingby (SE); Muhammad Kazmi, Sundbyberg (SE); Johan Rune, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 340 days.

(21) Appl. No.: 17/599,314

(22) PCT Filed: Mar. 27, 2020

(86) PCT No.: PCT/IB2020/052968
§ 371 (c)(1),
(2) Date: Sep. 28, 2021

(87) PCT Pub. No.: WO2020/194274
PCT Pub. Date: Oct. 1, 2020

(65) Prior Publication Data
US 2022/0167397 A1 May 26, 2022

Related U.S. Application Data

(60) Provisional application No. 62/825,749, filed on Mar. 28, 2019.

(51) Int. Cl.
*H04W 74/08* (2024.01)
(52) U.S. Cl.
CPC .................. *H04W 74/08* (2013.01)

(58) Field of Classification Search
CPC ..... H04B 17/17; H04B 17/382; H04W 74/08; H04W 74/0808; H04W 74/0825
See application file for complete search history.

(56) References Cited

U.S. PATENT DOCUMENTS

| 11,272,535 B2 * | 3/2022 | Chen ................... H04W 74/008 |
| 2015/0280847 A1 * | 10/2015 | Somasundaram ........ H04L 1/20 370/252 |

(Continued)

FOREIGN PATENT DOCUMENTS

| CN | 107926053 A | 7/2021 |
| EP | 3331312 A1 | 6/2018 |

(Continued)

OTHER PUBLICATIONS

Charter Communications, Feature lead summary #1 of initial access and mobility, R1-1811885, 3GPP TSG RAN WG1 Meeting RAN1#94BIS, Chengdu, P. R. China, Oct. 8-12, 2018.

(Continued)

*Primary Examiner* — Benjamin H Elliott, IV
(74) *Attorney, Agent, or Firm* — Ericsson Inc.

(57) ABSTRACT

A method by a wireless device includes receiving a message from a radio access network, RAN, node serving the wireless device including an indication of failure of a clear channel assessment, CCA, procedure by the RAN node on a wireless channel, and adapting a serving cell procedure in response to the message. A method by a RAN node, includes performing a CCA on a downlink channel, determining based on the CCA whether or not the downlink channel is occupied, and transmitting a message to a wireless device including an indication of a CCA failure based on a determination that the downlink channel was occupied. Related wireless devices and network nodes are disclosed.

26 Claims, 14 Drawing Sheets

(56) References Cited

U.S. PATENT DOCUMENTS

| | | | |
|---|---|---|---|
| 2017/0142754 A1* | 5/2017 | Uziel | H04W 16/14 |
| 2018/0139767 A1* | 5/2018 | Lee | H04W 16/14 |
| 2018/0184362 A1* | 6/2018 | Babaei | H04W 76/18 |
| 2018/0220459 A1* | 8/2018 | Park | H04W 74/08 |
| 2019/0363773 A1* | 11/2019 | Yerramalli | H04W 16/14 |
| 2020/0146063 A1* | 5/2020 | Xu | H04W 24/08 |
| 2020/0154480 A1* | 5/2020 | Jose | H04W 74/0825 |
| 2020/0221495 A1* | 7/2020 | Chen | H04W 74/0808 |
| 2020/0252821 A1* | 8/2020 | Deogun | H04W 76/19 |
| 2020/0329497 A1* | 10/2020 | Dinan | H04W 76/15 |
| 2021/0136606 A1* | 5/2021 | Jia | H04W 24/04 |
| 2021/0235500 A1* | 7/2021 | Hong | H04W 76/18 |
| 2021/0243808 A1* | 8/2021 | Deenoo | H04L 5/005 |
| 2021/0321277 A1* | 10/2021 | Murray | H04W 56/001 |
| 2021/0352721 A1* | 11/2021 | Zhang | H04W 72/21 |
| 2022/0095177 A1* | 3/2022 | Han | H04W 48/20 |
| 2022/0110153 A1* | 4/2022 | Wu | H04W 74/0808 |
| 2022/0167397 A1* | 5/2022 | Thangarasa | H04W 74/08 |
| 2022/0167412 A1* | 5/2022 | Agiwal | H04W 76/28 |

FOREIGN PATENT DOCUMENTS

| | | |
|---|---|---|
| KR | 20160121781 A | 10/2016 |
| WO | 2017178486 A1 | 10/2017 |
| WO | 2019035631 A1 | 2/2019 |

OTHER PUBLICATIONS

Vivo, Evaluation of the RLM for NR-U, R2-1814267, 3GPP TSG-RAN WG2 Meeting #103bis, Chengdu, China, Oct. 8-12, 2018.

"3rd Generation Partnership Project; Technical Specification Group Radio Access Network; Study on NR-based Access to Unlicensed Spectrum; (Release 16)", Technical Report, 3GPP TR 38.889 V1.1.0, (Dec. 2018), 119 Pages.

* cited by examiner

ADAPTING UE SERVING CELL PROCEDURES BASED ON DL CCA OPERATIONAL INFORMATION

This application is a 371 of International Application No. PCT/IB2020/052968, filed Mar. 27, 2020, which claims the benefit of U.S. Application No. 62/825,749, filed Mar. 28, 2019, the disclosures of which are fully incorporated herein by reference.

TECHNICAL FIELD

The present disclosure relates to wireless communication systems. More particularly, the present disclosure relates to wireless communications systems that use unlicensed spectrum in addition to licensed spectrum.

BACKGROUND

New Radio (NR) operation in unlicensed spectrum is being standardized in 3GPP Release 16. NR operation in unlicensed spectrum is denoted as NR-U. Operation in unlicensed spectrum is inherently different from operation in licensed spectrum, because the unlicensed spectrum may be shared by multiple networks, including networks operating according to different standards, e.g. LTE-LAA or Wi-Fi.

FIG. 1 illustrates communication between two devices, namely, a base station (BS) 10 and a user equipment (UE) 20 via a licensed channel 12 and an unlicensed channel 14. The licensed channel 12 and the unlicensed channel occupy different frequency bandwidths. That is, the licensed channel 12 falls into frequency spectrum licensed for use by a wireless network operator, such as frequency spectrum from 1.8 to 1.9 GHz, while the unlicensed channel falls into unlicensed spectrum, such as the industrial, scientific and medical (ISM) band from 2.4 to 2.5 GHz.

Although a guiding principle in the NR specification work is to reuse as much as possible from regular NR (i.e. NR operating in licensed spectrum), NR-U will have to conform to the regulatory requirements for operation in unlicensed spectrum. This includes the use of Listen-Before-Talk (LBT) in which a device/node must perform a Clear Channel Assessment (CCA) with a positive outcome (no detected transmission in the unlicensed radio channel/spectrum it intends to transmit in) before it may initiate a transmission.

To perform a CCA, a device (e.g., a UE or base station) monitors the channel for a predetermined time and measures the received energy in the channel. For Wi-Fi, the device checks for preamble transmission indicating the beginning of another device's transmission. To allow a transmission from a device, the received energy must be below a certain threshold (and/or no Wi-Fi preamble must be detected/received above a certain threshold) for the channel to be assessed as clear. The energy detection level threshold may, for example, be −72 dBm, above which the channel is considered busy and the device is required to defer transmission.

After sensing the channel to be idle, the device is typically allowed to transmit for a certain amount of time, sometimes referred to as the Channel Occupancy Time (COT) or Maximum Channel Occupancy Time (MCOT). The maximum allowed length of the COT depends on regulation and the type of CCA (e.g. for how long time the medium was sensed) that has been performed, and typically ranges from 1 ms to 10 ms. Gaps up to 16 μs are allowed in the transmission without performing an additional CCA. The CCA-free 16 μs gap was introduced to accommodate the turn-around time from reception of a transmission to acknowledgement of the transmission in Wi-Fi.

It is anticipated that for NR-U, a similar gap to accommodate for the radio turnaround time is expected to be allowed. This will enable the transmission of PUCCH carrying UCI feedback as well as PUSCH carrying data and possibly UCI without the CCA before the PUSCH/PUCCH transmission (if the gap between DL and UL transmission is less than or equal to 16 μs). Another option in case the gap is larger than 16 μs is for the UE to perform a short 25 μs CCA. Operation in this manner is typically called "COT sharing". FIG. 2 illustrates a transmission opportunity both with and without COT sharing after a successful CCA at the gNB.

In particular, FIG. 2 illustrates transmission opportunities both with and without COT sharing where CCA is performed by the initiating node (e.g. gNB). For the case of COT sharing the gap between DL and UL transmission is less than 16 μs.

Implementing the CCA/LBT mechanism and other procedures that are specific to operation in unlicensed spectrum forces NR-U to deviate from regular NR procedures. For example, the network can configure or allocate time windows instead of single occasions or a surplus of transmission occasions to compensate for potential CCA failures (i.e., to increase the chances of transmission success despite potential CCA failures). Examples of when this may be used include system information (SI) transmissions, paging transmissions, PUCCH transmissions, etc. Other ways of adapting to operation in unlicensed spectrum include, for example, behavioral adaptations to accommodate the risk that an expected reference signal or data transmission is absent, which may be due to CCA failure rather than a poor channel quality or a lost radio link.

Another consequence of operation in unlicensed spectrum is that networks operated by different operators may share the same spectrum in the same location. The unlicensed spectrum may be divided into parts/subbands, sometimes referred to as channels, typically consisting of 20 MHz each. The parts/subbands may mitigate problems caused by the spectrum sharing in the unlicensed spectrum. A network can selectively choose to operate in only one or in multiple ones of such spectrum parts/channels. In NR-U, such spectrum parts/channels may be referred to as Bandwidth Parts (BWPs), reusing the term and concept from regular NR, where a BWP is a part of the full carrier bandwidth, which can be allocated to UEs in RRC_CONNECTED and/or RRC_INATIVE and RRC_IDLE state.

A network may mitigate the problem of spectrum sharing by favoring operation in less loaded channels, i.e., channels for which the channel occupancy is low.

CCA/LBT Categories

As described above, Listen-Before-Talk (LBT) is designed for unlicensed spectrum co-existence with other radio access technologies (RATs) and other users of the system and the medium. In this mechanism, a radio device applies a Clear Channel Assessment (CCA) check before any transmission. The transmitter performs energy detection (ED) over a time period and compares the results to an ED threshold to determine if a channel is idle. Another CCA mechanism is to detect a known preamble. In case the channel is determined to be occupied, the transmitter performs a random back-off within a contention window before next CCA attempt.

To allow for transmission of acknowledgements (ACKs), the transmitter must defer a period after each busy CCA slot prior to resuming back-off. As soon as the transmitter has grasped the channel, the transmitter is only allowed to perform transmission up to a maximum time duration called the Maximum Channel Occupancy time (MCOT). For QoS differentiation, a channel access priority scheme based on the service type has been defined. For example, in LTE-LAA four CCA/LBT Channel Access Priority Classes (CAPCs) are defined for differentiation of contention window sizes (CWS) and MCOT between services.

Therefore, when scheduling UL/DL traffic, the eNB should consider the QoS class indicator (QCI) of the traffic to be transmitted. For uplink, the CAPC that the UE needs to use for a given UL transmission is either signaled in the uplink (UL) grant on the PDCCH for dynamic scheduling or indicated as part of a logical channel configuration for autonomous LTE-LAA UL transmissions. In the latter case, the UE shall apply the CAPC indicated in the logical channel configuration when autonomously transmitting data from that logical channel. In case there are multiple MAC service data units (SDUs) multiplexed in the same MAC protocol data unit (PDU) and associated with different logical channels, the UE shall apply the QCI associated with the lowest CAPC of all the logical channels included in the MAC PDU.

The channel access schemes for NR-based access for unlicensed spectrum can be classified into the following categories:

Category 1: Immediate transmission after a switching gap no longer than 16 μs. This is used for a transmitter to immediately transmit after a UL/DL switching gap inside a COT. The reason for the switching gap from reception to transmission is to accommodate the transceiver turnaround time.

Category 2: CCA/LBT without random back-off. The duration of time that the channel is sensed to be idle before the transmitting entity transmits is deterministic.

Category 3: CCA/LBT with random back-off with a contention window of fixed size. The CCA/LBT procedure has the following procedure as one of its components. The transmitting entity draws a random number N within a contention window. The size of the contention window is specified by the minimum and maximum value of N. The size of the contention window is fixed. The random number N is used in the CCA/LBT procedure to determine the duration of time that the channel is sensed to be idle before the transmitting entity transmits on the channel.

Category 4: CCA/LBT with random back-off with a contention window of variable size. The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the CCA/LBT procedure to determine the duration of time that the channel is sensed to be idle before the transmitting entity transmits on the channel.

CCA/LBT Failures Triggering RLF

It has been suggested that consistent or too frequent CCA failures should trigger a radio link failure (RLF). RLF declaration and subsequent radio link reestablishment are UE autonomous procedures. As such, UL CCA failures are easily incorporated, since these are experienced directly by the UE. However, downlink (DL) CCA failures can only be indirectly detected by a UE, for example, due to lack of reception, or possibly a delay of the reception, of a discovery reference signal (DRS) in accordance with the repetitive schedule of the DRS in the cell. In addition, it is inherently difficult for a UE to distinguish between cases where the lack of reception of a DRS is due to CCA failure(s) at the gNB or due to a bad DL radio channel. A solution where the UE makes this distinction based on the amount of detected energy or power level has been suggested and specified for LTE-LAA.

Radio Link Monitoring

The purpose of radio link monitoring (RLM) is to estimate a radio link quality of the serving cell of the UE over certain evaluation period and based on the estimated radio quality to decide whether the UE is in in-sync (IS) or in out-of-sync (OOS) with respect to the serving cell. The in-sync and out-of-sync evaluations are done by the UE over evaluation periods, e.g. 100 ms and 200 ms for IS and OOS evaluations respectively, in non-DRX. In LTE, the RLM is carried out by UE by performing measurement on downlink cell specific reference signal (CRS) in RRC_CONNECTED state. If results of radio link monitoring lead to predetermined number of consecutive out of sync (OOS) indications, then the UE starts the RLF procedure by starting the RLF timer (e.g. T310). The UE declares radio link failure (RLF) after the expiry of RLF timer (e.g. T310). However, if the UE detects certain number of consecutive in-sync (IS) indications while the RLF timer is running, then the UE resets the RLF timer, i.e. the RLF procedure is aborted. Upon the occurrence of RLF (e.g. when T310 expires), the UE turns its transmitter off. The actual procedure to detect IS or OOS is carried out by comparing the estimated downlink reference signal measurements (e.g. SNR on CRS) to some target Block Error Rate (BLER) values, Qout and Qin. Qout and Qin correspond to hypothetical BLER of DL control channel, PDCCH/PCIFCH transmissions from the serving cell. Examples of Qout and Qin are 10% and 2% respectively for enhanced Mobile Broadband (eMBB).

A similar procedure is applied in NR. However, in NR, the UE estimates the DL signal quality for OOS/IS detection based on signals in Synchronization Signal Block (SSB) or Channel State Information-Reference Signal (CSI-RS) and compares them with Qin and Qout to detect IS and OOS. The SSB is also called the SS/PBCH block, which is transmitted in a cell periodically with periodicities of 5, 10, 20, 40, 80 or 160 ms. CSI-RS for RLM is transmitted in the cell periodically with periodicities of 4, 5, 8, 10, 16, 20, 40, 80, 160 and 320 slots. The actual time for slot depends on NR SCS, i.e., 1 ms for 15 kHz, 0.5 ms for 30 kHz, 0.25 ms for 60 kHz, and 0.125 ms for 120 kHz, etc.

SUMMARY

Some embodiments provide a method performed by a wireless device. The method includes receiving a message from a radio access network, RAN, node serving the wireless device including an indication of failure of a clear channel assessment, CCA, procedure by the RAN node on a wireless channel, and adapting a serving cell procedure in response to the message.

In some embodiments, the method further includes establishing a wireless connection with the RAN node using a wireless channel before receiving the message.

In some embodiments, the indication of failure of the CCA procedure includes a bitmap indicating failed and successful CCA instances.

In some embodiments, the bitmap indicates locations of resources associated with CCA failure and locations of resources associated with CCA success. In some embodiments, the resources include time resources.

In some embodiments, adapting the serving cell procedure includes adapting monitoring and/or measurements on the wireless channel and/or adapting monitoring and/or reporting on an operational status of the wireless device.

In some embodiments, adapting the serving cell procedure includes selectively filtering measurements based on the bitmap.

In some embodiments, adapting the serving cell procedure includes comparing the bitmap to a list of samples obtained over a measurement time interval and selectively excluding samples which were obtained based on contents of the bitmap.

In some embodiments, adapting the serving cell procedure includes adapting a radio link failure, RLF, declaration process, wherein adapting the RLF declaration process includes performing at least one of restarting or extending an RLF timer, suspending the RLF timer, restarting or extending an out-of-sync and/or in-sync evaluation period, resetting an out-of-sync and/or in-sync counter, changing a value of the out-of-sync counter to compensate for out-of-sync events that result from CCA failure at the RAN node, suspending the out-of-sync counter, and/or adapting a threshold for when out-of-sync events trigger a start of the RLF timer.

In some embodiments, adapting the serving cell procedure includes adapting a beam management procedure. Adapting the beam management procedure may include performing at least one of extending a beam failure detection evaluation time with respect to a reference signal evaluation time, restarting a beam failure detection process, restarting a candidate beam detection process, extending the candidate beam detection process, adapting a threshold for triggering a beam failure detection or declaration, adapting a threshold for triggering start of a timer for beam failure detection or declaration, and/or postponing the candidate beam detection process.

In some embodiments, the method further includes modifying a cell measurement procedure based on the indication of the CCA failure received from the RAN node.

In some embodiments, modifying a cell measurement includes performing at least one of modifying radio link monitoring, beam management, cell change or power control, stopping or preventing a measurement based on the indication of CCA failure indicating a plurality of failures, or stopping future cell measurements for a predetermined period of time.

In some embodiments, the method further includes resuming cell measurement from a last sample prior to stopping cell measurements.

In some embodiments, the indication of the CCA failure is received via at least one of a Physical Broadcast Channel, PBCH, one or more payload bits outside a master information block, MIB, of a PBCH, a System Information Block, SIB, a single bit, and/or more than one bit.

In some embodiments, the indication of CCA failure includes one or more of beam related information, information related to a direction of a beam, a number of CCA failures that have occurred, and/or a ratio of successful to failed CCA attempts.

In some embodiments, the indication of the CCA failure is sent in response to occurrence of a triggering event.

In some embodiments, the method further includes providing user data, and forwarding the user data to a host computer via transmission to the RAN node.

In some embodiments, the wireless channel includes one or more of unlicensed spectrum, shared spectrum, spectrum subject to a CCA procedure, spectrum subject to a listen before talk, LBT, procedure and/or spectrum for contention based operation.

A wireless device according to some embodiments includes processing circuitry, and memory coupled with the processing circuitry. The memory includes instructions that when executed by the processing circuitry causes the communication device to perform operations including receiving a message from a radio access network, RAN, node serving the wireless device, the message including an indication of a failure of a clear channel assessment, CCA, procedure by the RAN node on a wireless channel, and adapting a serving cell procedure in response to the message.

Some embodiments provide a wireless device adapted to perform operations including receiving a message from a radio access network, RAN, node serving the wireless device, the message including an indication of a failure of a clear channel assessment, CCA, procedure by the RAN node on a wireless channel, and adapting a serving cell procedure in response to the message.

Some embodiments provide a method performed by a radio access network, RAN, node, including performing a clear channel assessment, CCA, on a downlink channel, determining, based on the CCA, whether or not the downlink channel is occupied, and transmitting a message to a wireless device, the message including an indication of a CCA failure, the CCA failure based at least in part on the determination that the downlink channel was occupied.

In some embodiments, the method further includes establishing a wireless connection with the wireless device before receiving the message.

In some embodiments, the indication of failure of the CCA procedure includes a bitmap indicating failed and successful CCA instances.

In some embodiments, the bitmap indicates locations of resources associated with CCA failure and locations of resources associated with CCA success. In some embodiments, the resources include time resources.

In some embodiments, the indication of the CCA failure is transmitted via at least one of a Physical Broadcast Channel, PBCH, one or more payload bits outside a master information block, MIB, of a PBCH, and/or a System Information Block, SIB.

In some embodiments, the indication of the CCA failure includes at least one of a single bit, more than one bit, beam related information, information related to a direction of a beam, a number of CCA failures that have occurred, and/or a ratio of successful to failed CCA attempts.

In some embodiments, the indication of the CCA failure is sent in response to occurrence of a triggering event.

In some embodiments, the method further includes obtaining user data, and forwarding the user data to the wireless device via the downlink channel.

In some embodiments, the wireless channel including one or more of unlicensed spectrum, shared spectrum, spectrum subject to a CCA procedure, spectrum subject to a listen before talk, LBT, procedure and/or spectrum for contention based operation.

A radio access network, RAN, node according to some embodiments includes processing circuitry, and memory coupled with the processing circuitry. The memory includes instructions that when executed by the processing circuitry causes the RAN node to perform operations including performing a clear channel assessment, CCA, on a downlink channel, determining, based on the CCA, whether or not the downlink channel is occupied, and transmitting a message to the wireless device, the message including an indication of a CCA failure, the CCA failure based at least in part on the determination that the downlink channel was occupied.

Some embodiments provide a radio access network, RAN, node adapted to perform operations including performing a clear channel assessment, CCA, on a downlink channel, determining, based on the CCA, whether or not the downlink channel is occupied, and transmitting a message to the wireless device, the message including an indication of a CCA failure, the CCA failure based at least in part on the determination that the downlink channel was occupied.

DETAILED DESCRIPTION OF EMBODIMENTS

Figure 1:
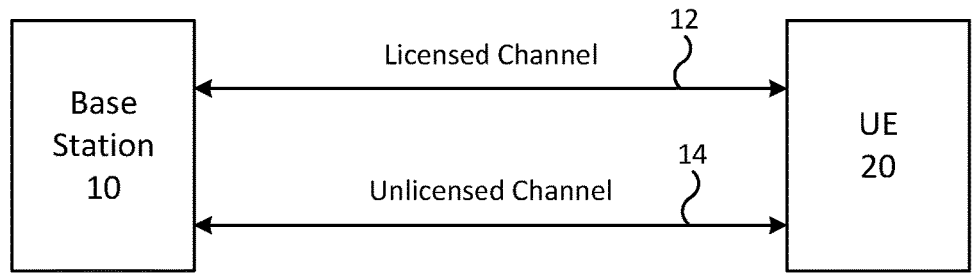
FIG. 1 is a schematic block diagram that illustrates communications between a base station and a wireless device using licensed spectrum and unlicensed spectrum.
Figure 2:
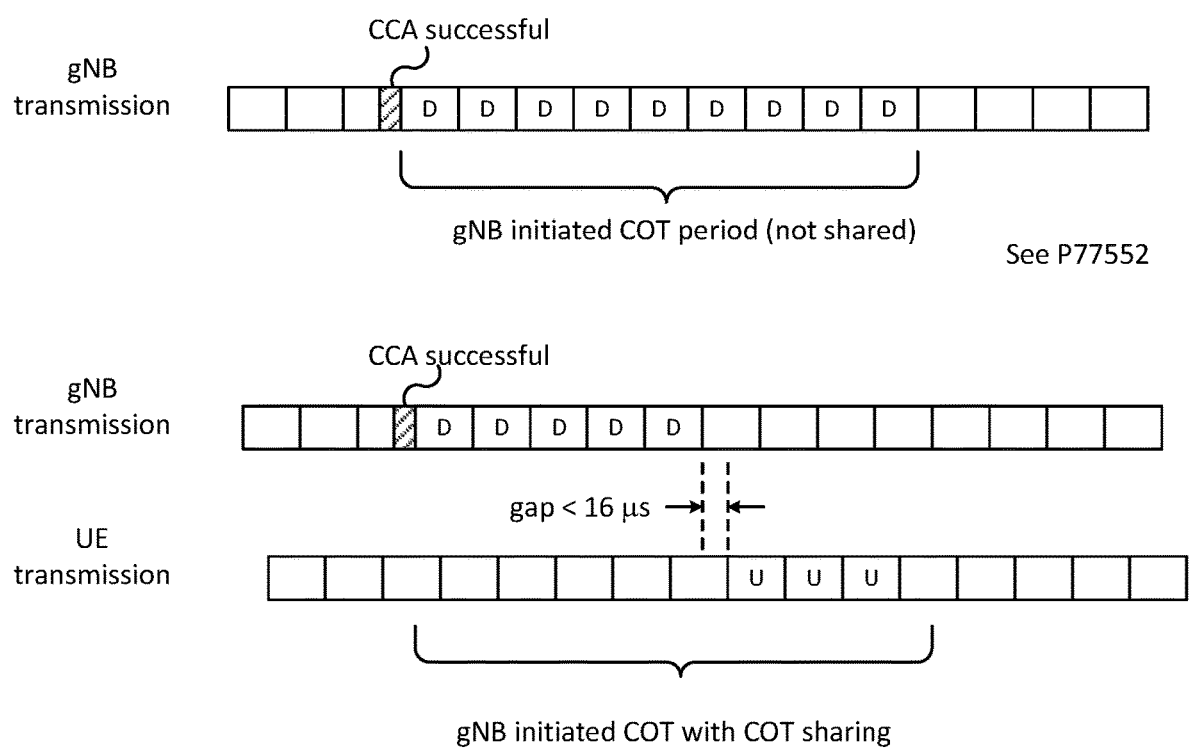
FIG. 2 illustrates transmission opportunities both with and without COT sharing where CCA is performed by the initiating node (e.g. gNB).

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Discovery Reference Signals in NR

The discovery reference signals (DRS) in NR include the synchronization signal and PBCH block (SSB) and more specifically consists of the Primary Synchronization Signal (PSS), the Secondary Synchronization Signal (SSS), the Physical Broadcast Channel (PBCH), and Demodulation Reference Symbols (DM-RS).

The SSB, which is also referred to as "SS/PBCH block," includes four consecutive OFDM symbols in time domain and 240 consecutive subcarriers in frequency domain. Since each resource block (RB) comprises 12 subcarriers, the comprises 20 RBs regardless of the SSB subcarrier spacing (SCS). The bandwidth however depends on the SCS of the SSB e.g. 3.6 MHz, 7.2 MHz, 28.8 MHz and 57.6 MHz for SCS of 15 kHz, 30 kHz, 120 kHz and 240 kHz respectively. Multiple SSBs can be transmitted within a half-frame (5 ms) in an NR cell, denoted as an SSB burst. The maximum number of SSBs and their locations in the SSB burst depends on the frequency range, as well as on the SSB numerology (e.g. SCS). The SSB burst (hence the individual SSBs) are transmitted according to SS/PBCH block measurement timing configuration (SMTC) cycle, which may be 5, 10, 20, 40, 80 or 160 ms. The SMTC cycle is also interchangeably referred to as SMTC period or SMTC periodicity. The default periodicity is 20 ms, which is assumed by the UE during the initial cell search procedure. During each SMTC cycle or SMTC period, one or more SSBs are transmitted during a time window called the SMTC window. The maximum SMTC window duration is 5 ms but the actual window depends on several factors, such as subcarrier spacing (SCS) of SSB, number of SSBs (which correspond to number of beams) within the SMTC window, etc. The SMTC window duration can be, for example, 1 ms, 2 ms, 3 ms, 4 ms or 5 ms.

The signals in SSB are used by the UE for performing one or more operations, such as time and/or frequency synchronization, radio link monitoring (e.g. out of sync (OOS) evaluation, in-sync (IS) evaluation, etc.), cell search, measurements (e.g. SS-RSRP, SS-RSRQ, SS-SINR, etc), channel estimation etc.

There currently exist certain challenge(s). For example, the UE cannot know whether lack of detection/reception of an expected discovery reference signal (DRS) (e.g. SSB etc.)

at the UE is due to CCA failure or due to a bad channel (e.g. low signal quality such as SINR). The LTE-LAA method, which relies on an energy/power threshold, is uncertain and thus prone to errors. In NR there are several measurement procedures which rely on DRS (e.g., SSB) and/or that are performed over a shorter time period compared to LTE-LAA, such as beam management. The uncertainty of the significance of poor measurement results and the consequent inaccuracy in the assessment of the quality, load and/or occupancy of the channel may have significant impact on any procedure, such as RLF declaration, that depends on detection of channel quality or channel occupancy measurements and/or DL CCA failures.

Certain embodiments described herein may provide solutions to these or other challenges. For example, according to some embodiments, a UE obtains information about DL CCA failures and uses that information for adapting the measurements procedures in serving cell operational tasks. In particular, in some embodiments, a UE obtains information regarding CCA failure from a network node (such as a serving network node or base station) and uses the received information to adapt its serving cell procedures. Examples of serving cell procedures that may be adapted in response to this information are radio link monitoring, cell re-selection, handover, measurement procedures, RRC re-establishment, etc. Typically, the serving cell procedures are based on RRM measurements which can be based on single-shot measurements or can be based on averaged results. If the measurements used in these procedures are subject to LBT failures, then the procedures may be affected. According to some embodiments described herein, a UE may adapt measurement behavior based on received CCA failure information. Such adaptation may include skipping RRM measurements, excluding certain measurement results, suspending measurements, delaying measurements and/or restarting measurements.

Radio link monitoring is one of the core procedures in the UE which involves UE evaluating the quality of the radio link based on reference signal (RS) measurement. If a UE happens to evaluate the RLM during a time period in which there were no reference signals transmitted from the serving network node due to LBT failure, then the UE may extend the evaluation period or restart the evaluation, e.g. by restarting of a timer, such as timer T310. Similar adaptations can be made in the beam management procedure.

Certain embodiments may provide one or more technical advantages, such as helping the UE to make more correct measurement evaluations, which can in turn help the UE to make more correct operational decisions, such as RLF declaration, beam failure detection, cell change decisions, etc. This can improve the UE performance as well as overall network performance.

Some embodiments will be described more fully with reference to the accompanying drawings. However, the disclosed subject matter should not be construed as limited to only the embodiments set forth herein; rather, these embodiments are provided by way of example to convey the scope of the subject matter to those skilled in the art. The embodiments are described in the context of NR operation in unlicensed spectrum (NR-U). However, the embodiments described herein are not limited to NR-U scenarios, but are also potentially applicable to other standards, such as LTE-LAA/eLAA/feLAA.

Accordingly, in some embodiments, a UE obtains information related to CCA failures from a serving network node, and adapts a measurement procedure in the UE based on obtained CCA failure information. In some embodiments, a radio access network, RAN, node performs a clear channel assessment on a downlink channel including unlicensed spectrum. Upon determining, based on the CCA, that the downlink channel is occupied, the RAN node transmits a message to a wireless device containing an indication of CCA failure.

As used herein, the term "node" can be a network node, base station, UE, or other wireless device. Examples of network nodes are NodeB, base station (BS), multi-standard radio (MSR) radio node such as MSR BS, eNodeB, gNodeB, MeNB, SeNB, integrated access backhaul (IAB) node, network controller, radio network controller (RNC), base station controller (BSC), relay, donor node controlling relay, base transceiver station (BTS), Central Unit (e.g. in a gNB), Distributed Unit (e.g. in a gNB), Baseband Unit, Centralized Baseband, C-RAN, access point (AP), transmission points, transmission nodes, RRU, RRH, nodes in distributed antenna system (DAS), core network node (e.g. MSC, MME etc), O&M, OSS, SON, positioning node (e.g. E-SMLC), etc. Another example of a node could be user equipment (UE), which refers to any type of wireless device communicating with a network node and/or with another UE in a cellular or mobile communication system. Examples of UE are a target device, device to device (D2D) UE, vehicular to vehicular (V2V), machine type UE, MTC UE or UE capable of machine to machine (M2M) communication, PDA, Tablet, mobile terminals, smart phone, laptop embedded equipment (LEE), laptop mounted equipment (LME), USB dongle, etc.

In some embodiments, generic terms, such as "radio network node" or simply "network node (NW node)", are used. These terms can refer to any kind of network node, including a base station, radio base station, base transceiver station, base station controller, network controller, evolved Node B (eNB), Node B, gNodeB (gNB), relay node, access point, radio access point, Remote Radio Unit (RRU) Remote Radio Head (RRH), Central Unit (e.g. in a gNB), Distributed Unit (e.g. in a gNB), Baseband Unit, Centralized Baseband, C-RAN, access point (AP etc.

The term radio access technology, or RAT, may refer to any wireless communication technology, such as UTRA, E-UTRA, narrow band internet of things (NB-IoT), WiFi, Bluetooth, next generation RAT, New Radio (NR), 4G, 5G, etc. Any of the equipment denoted by the terms node, network node or radio network node may be capable of supporting a single or multiple RATs.

The term signal used herein can be any physical signal or physical channel. Examples of physical signals are reference signal such as PSS, SSS, CSI-RS, DMRS, signals in SSB, DRS, CRS, PRS etc. The term physical channel (e.g., in the context of channel reception) used herein is also called "channel". Examples of physical channels are PBCH, NPBCH, PDCCH, PDSCH, sPUCCH, sPDSCH. sPUCCH. sPUSCH, MPDCCH, NPDCCH, NPDSCH, E-PDCCH, PUSCH, PUCCH, NPUSCH etc.

The term "time resource" used herein may correspond to any type of physical resource or radio resource expressed in terms of length of time. Examples of time resources include a symbol, time slot, subframe, radio frame, TTI, interleaving time, slot, sub-slot, mini-slot, etc.

The term "LBT" as used herein may correspond to any type of carrier sense multiple access (CSMA) procedure or mechanism which is performed by a node on a carrier before deciding to transmit signals on that carrier. CSMA or LBT may also interchangeably be called clear channel assessment (CCA), clear channel determination etc. The transmission of signals on a carrier subjected to LBT is also called contention-based transmission. On the other hand, the transmission of signals on a carrier which is not subjected to LBT is also called contention free transmission.

The term clear channel assessment (CCA) used herein may correspond to any type of carrier sense multiple access (CSMA) procedure or mechanism which is performed by the device on a carrier before deciding to transmit signals on that carrier. The CCA is also interchangeably called CSMA scheme, channel assessment scheme, listen-before-talk (LBT) etc. The CCA based operation is more generally called contention-based operation. The transmission of signals on a carrier subjected to CCA is also called contention-based transmission. The contention-based operation is typically used for transmission on carriers of unlicensed frequency band. But this mechanism may also be applied for operating on carriers belonging to licensed band for example to reduce interference. The transmission of signals on a carrier which is not subjected to CCA is also called contention free transmission.

According to some embodiments, a UE obtains and applies information relating to CCA operational results for measurement procedures.

In the step of obtaining CCA failure information, the UE obtains information related to the CCA operational results or outcome of one or more CCA operations performed by a network node, e.g. in the serving base station of the UE, prior to an attempt to transmit a DL signal or message to the UE. For example, the CCA operations are performed by the network node prior to transmitting signals in the downlink. The CCA operational results may include results of CCA failure and/or CCA success. The CCA operational results can be obtained by the network node over a certain time period (T0). The parameter T0 can be obtained by the UE in a number of ways. For example, the parameter T0 may be pre-defined in the UE, may be autonomously determined by the network node, may be determined based on request received from the UE, and/or may be indicated by the UE (e.g., the UE may determine the parameter and send a request to the network node with the parameter).

The parameter T0 may further depend on the purpose or type of procedures for which the CCA operational results are to be used by the UE. For example, T0=T01 for measurements for mobility and/or for power control, T0=T02 for radio link monitoring, T0=T03 for beam management related procedure, etc. As an example, T01>T02>T03. As a special case T0=T01=T02=T03. In yet another example T01=T02 while T03<T01 or T02. Furthermore, the various purposes of channel access attempts may sometimes be categorized or classified in terms of priorities, e.g. channel access priority class (CAPC).

In NR, standalone operation on unlicensed band (NR-U SA mode) will be supported and is being specified as part of NR Release 16 work. This means the UE can be served only by a primary cell (PCell) in an unlicensed band. The UE can also be served by a primary secondary cell (PSCell) in an unlicensed band in dual connectivity operation involving multiple NR-U cells. In unlicensed band operation, a device (e.g. base station or UE) may not always be able to access the channel for transmission of signals due to CCA failures, such as when multiple devices want to access the same channel simultaneously (causing a collision with interfering data transmissions or back-off by a subset of the devices) or if one device is in the middle of a transmission on the channel while another device tries to access it (by initiating a CCA procedure). The CCA failures in the network node may result in unavailability of vital signals, such as synchronization signals, reference signals, (e.g. SSB, CSI-RS in NR) at the UE that are used by the UE for signal measurements (e.g. signal quality, signal strength etc.) for measurement procedures such as mobility measurements, radio link monitoring (RLM), beam management, uplink power control etc.

In this step, the UE obtains information related to the CCA operational results (e.g. CCA failures) in a network node. Such information is also referred to as CCA operational information (e.g. CCA failure information, CCA success information etc.), which can be transmitted by the serving network node to the UE. The information can be transmitted by the network node in system information, in dedicated information (e.g. to a specific UE) or to group of the UEs (e.g. multicasting). The information can be transmitted to the UE in higher layer signaling (e.g. RRC message etc.) and/or in lower layer signaling (e.g. in a MAC command, MAC CE, DCI, physical control channel etc.). The contents or type of CCA operational information that can be signaled to the UE is explained with several examples below.

In a first example, it is assumed that the UE obtains statistical information from the serving network node expressed in terms of one or more levels of CCA failures, as shown in Table 1. In this case, the obtained CCA operation information indicates the level of CCA failures, e.g. Low, Medium, High, and Very High. In another example, the signaled value may only include two values, e.g. Low and High. In yet another example, these levels can be associated with percentages of CCA failures or CCA failure rates, i.e. Low means the percentage of CCA failures or CCA failure rate is low while High means that the CCA failure percentage or CCA failure rate is high, see Table 2. The CCA failure rate may be expressed as a ratio of the number of the failed (unsuccessful) CCAs to the total number of CCA attempts over a certain time period (e.g. T0). The percentage of CCA failure is the CCA failure rate expressed in percentage. The CCA failure rate can also be expressed in any other scale e.g. logarithmic scale, CCA failures per time unit, etc.

Alternatively, the obtained CCA operation information can be expressed in terms of the statistics of the CCA success levels and/or success rates. This is shown in examples in Table 3 and Table 4. The CCA success rate may be expressed as a ratio of a number of the successful CCAs to a total number of CCA attempts over predetermined time period (e.g. T0). The percentage of CCA successes is the CCA success rate expressed in percentage. The CCA success rate can also be expressed in any other scale, such as logarithmic scale, CCA successes per time unit, etc.

TABLE 1

Example showing the obtained information of CCA failure expressed in discrete levels.

| Signaled value/ indicator | CCA failure level |
| --- | --- |
| 00 | Low |
| 01 | Medium |
| 10 | High |
| 11 | Very high |

TABLE 2

Example showing obtained information on CCA
failure expressed in percentage of CCA failures.

| Signaled value/ indicator | CCA failure level | CCA failure rate [%] (R) |
|---|---|---|
| 00 | Low | R ≤ 10 |
| 01 | Medium | 10 < R ≤ 30 |
| 10 | High | 30 < R ≤ 50 |
| 11 | Very high | 50 < R ≤ 100 |

TABLE 3

Example showing the obtained information
of CCA success expressed in discrete levels.

| Signaled value/ indicator | CCA success level |
|---|---|
| 00 | Low |
| 01 | Medium |
| 10 | High |
| 11 | Very high |

TABLE 4

Example showing obtained information on CCA
success expressed in percentage of CCA success.

| Signaled value/ indicator | CCA success level | CCA success rate [%] (S) |
|---|---|---|
| 00 | Low | S ≤ 10 |
| 01 | Medium | 10 < S ≤ 30 |
| 10 | High | 30 < S ≤ 50 |
| 11 | Very high | 50 < S ≤ 100 |

In yet another example, the CCA operation information can be expressed in terms of the relative statistics with respect to reference CCA results or values. Examples of the reference CCA results or values are pre-defined values, previous CCA results obtained by the network node etc. For example, the relative CCA operational information can be expressed as the difference between the CCA operational results obtained at T1 and the CCA operational results obtained at T2.

As an example, assume that at time, T1, the CCA operational results such as CCA failure results are denoted by R1, and at time, T2, the CCA operational results such as CCA failure results are denoted by R2. The UE can obtain the relative CCA results in terms of R1−R2 or R2−R1. An example the relative change in the CCA failure levels with respect to previous CCA failure levels with ΔR=(R1−R2) is shown in Table 5. In another example, the relative change in the CCA failure rate/percentage with respect to previous CCA failure rate/percentage with ΔR=(R1−R2) is shown in Table 6. In another example, CCA statistics are conveyed to the UE in terms of relative change or, alternatively, the UE may determine the relative change based on CCA statistics received from the network node. Using similar notation as above, i.e., R1 denoting the CCA operational result in terms of CCA failures or CCA failure rate at time T1, and R2 denoting the CCA operational result in terms of CCA failures or CCA failure rate at time T2, the relative change, ΔRRelative, may be calculated as ΔRRelative=(R2−R1)/R1.

Similar examples can be extended for CCA operation information expressed in terms of change in the CCA success rates and/or levels.

TABLE 5

Example showing the obtained information
of CCA failure expressed in change in the CCA
failure levels with respect to the reference CCA
(e.g. previous CCA failure levels) failure levels

| Signaled value/ indicator | Change in CCA failure level with respect to previous CCA failure level |
|---|---|
| 00 | Unchanged |
| 01 | increase |
| 10 | Decrease |

TABLE 6

Example showing obtained information on
CCA failure expressed in change in the
percentage of CCA failures with respect to reference
CCA failure values (e.g. previous CCA failures)

| Signaled value/ indicator | CCA failure level with respect to previous CCA failure level | Change in CCA failure rate [%] with respect to previous CCA failure rate (ΔR = R1−R2) |
|---|---|---|
| 0 | High increase | −100 ≤ ΔR ≤ −50 |
| 1 | Medium increase | −50 < ΔR ≤ −30 |
| 2 | Low increase | −30 < ΔR ≤ −10 |
| 3 | Very low increase | −10 < ΔR ≤ 0 |
| 4 | Low decrease | 0 < ΔR ≤ 10 |
| 5 | Medium decrease | 10 < ΔR ≤ 30 |
| 6 | High decrease | 30 < ΔR ≤ 50 |
| 7 | Very high decrease | 50 < ΔR ≤ 100 |

In yet another example, it is assumed that the UE obtains absolute information from the serving network node about the CCA operational results, e.g. CCA failures and success. An example of such information is the rate of success or failures over the last N time resources or duration of T0. In a specific example, the obtained information may indicate that M number of CCA failures have occurred over the last N1 number of time resources e.g. N1 slots etc. In yet another example, the obtained information may indicate that M number of CCA failures have occurred over last N2 number of CCA attempts. In yet another example, the obtained information may indicate that M number of CCA failures have occurred over a certain time period (T0). In yet another example, the obtained information may indicate that K number of CCA successes have occurred over the last N1 number of time resources, e.g. N1 slots, etc. In yet another example, the obtained information may indicate that K number of CCA successes have occurred over the last N2 number of CCA attempts. In yet another example, the obtained information may indicate that K number of CCA successes have occurred over a certain time period (T0).

Figure 3:
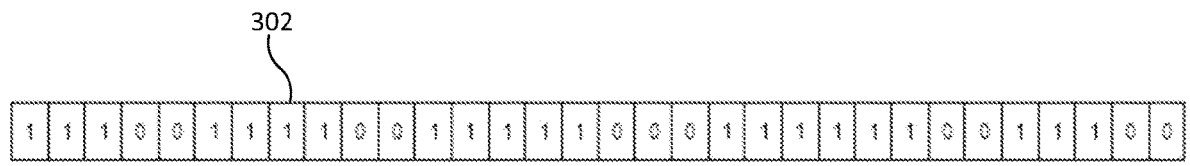
FIG. 3 illustrates a bitmap that can be used to indicate CCA failure in accordance with some embodiments.

In yet another example, it is assumed that the obtained information related to the CCA operational results (CCA failure and success) is communicated to the UE in the form of a bitmap indicating the failed and successful CCA instances. For example, the length of the bitmap can be 32, which indicates the time resources which were subject to CCA failures and the time resources in which the CCA was successful. This is shown in FIG. 3, which is an example showing the obtained information on CCA failure using a bitmap 302.

For example, 0 in the bitmap 302 may indicate CCA failure during a corresponding time resource, while a 1 in the bitmap may indicate CCA success during a corresponding time resource. The time resource can be, for example, a slot, a frame or resource containing specific signals e.g. SSB, CSI-RS etc. As an example, the time resource can represent each SSB or SMTC occasion or window or duration which contains DRS signals (e.g. PSS/SSS, PBCH etc.) used by the UE for procedures. The SMTC occasion occurs with SMTC periodicity e.g. every 40 ms.

In another bitmap example, a bitmap has one position for each time slot (e.g. slot, partial slot, mini-slot, subframe, radio frame) without any gaps in the timeline, where 0 indicates CCA failure (i.e. the channel was occupied) in the corresponding time slot and 1 means either that the channel was clear (e.g. CCA was successful in the time slot) or the channel status is unknown for that time slot (e.g. because not CCA was performed in the time slot).

In yet another bitmap example, the CCA information is represented in terms of two bitmaps (e.g., a first and a second bitmap). The first bitmap indicates in which time slots (i.e. slot, partial slot, mini-slot, subframe, radio frame) the channel occupancy status (as perceived by the network node) is known, i.e. the time slots in which the network node performed CCA or obtained the channel occupancy status by other means. The second bitmap indicates the CCA operational results (i.e. success or failure), or the channel occupancy status, in the time slots where the channel occupancy status (from the perspective of the network node) is known according to the first bitmap.

For example, the first bitmap may indicate 1 for a time slot where the channel occupancy status (as perceived by the network node) is known and 0 for a time slot where the channel occupancy status (as perceived by the network node) is unknown. Then the bits of the second bitmap would correspond to the bits of the first bitmap which are set to 1. That is, if the first bitmap contains N bits and M (where M N) bits are set to 1, then the second bitmap would contain M bits, where each bit would correspond to one of the M bits set to 1 in the first bitmap. Alternatively, the second bitmap also contains N bits, but only the first M bits are used (i.e. the remaining bits, if any, do not have any significance and can be ignored) and each of these M bits in the second bitmap corresponds to one of the bits set to 1 in the first bitmap. These (significant) M bits in the second bitmap indicate the results of the channel occupancy status assessment (e.g. CCA operational results) of the time slots corresponding to the bits set to 1 in the first bitmap. For example, if one of the M bits in the second bitmap is set to 0, this means that the channel occupancy status (as perceived by the network node), obtained from CCA operation or by other beams, was "occupied channel" (e.g. CCA failure). Conversely, if one of the M bits in the second bitmap is set to 1, this means that the channel occupancy status (as perceived by the network node), obtained from CCA operation or by other beams, was "clear channel" (e.g. CCA success).

Once the CCA information has been obtained, the UE uses the information for adapting its procedures for interacting with the serving cell (referred to herein as serving cell procedures), such as its measurement procedures. The UE performs measurements on the downlink received signals and uses them in different operational tasks in the serving cell. Typical operational tasks in serving cell are based on downlink measurements. Examples of serving cell tasks are radio link monitoring, beam management, cell change, power control etc.

The downlink measurements are typically performed over a period of time, during which UE obtains samples of the received DL signal and/or channel and applies some filtering, e.g. coherent averaging, non-coherent averaging etc., to the samples. The problem with this classical approach is that UE may end up using samples that do not contain any actual signal or channel, and instead may only contain interference or noise, i.e. unwanted signals. To overcome this problem, the UE uses the obtained information regarding CCA success/failure in the previous step to adapt its procedures. This is explained using a few examples below.

Figure 4:
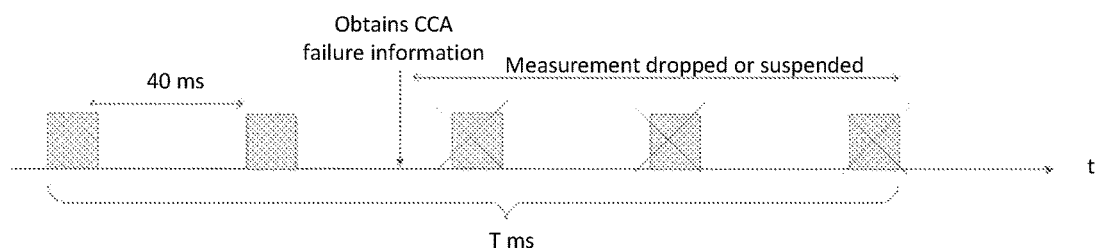
FIG. 4 illustrates adaptation by a UE of ongoing measurement activity based on obtained CCA information in accordance with some embodiments.

In a first example, it is assumed that UE obtains one sample of a received signal (e.g. DRS, SSB etc.) every 40 ms for a period of time T, where T=200 ms. While the UE is in the process of carrying out the sampling, the UE also obtains information about the CCA failures as described above. The UE uses the received information about the CCA operational results for adapting the ongoing measurement procedure, which can result in different outcome depending on the obtained information. If the obtained CCA information indicates that CCA failure is Low, the UE may choose to continue with the ongoing measurement procedure. However, if the obtained CCA failure information is High, the UE may choose to drop the ongoing measurement and/or also suspend any future measurement attempt for a period of time. The scenario is illustrated in FIG. 4.

Figure 5:
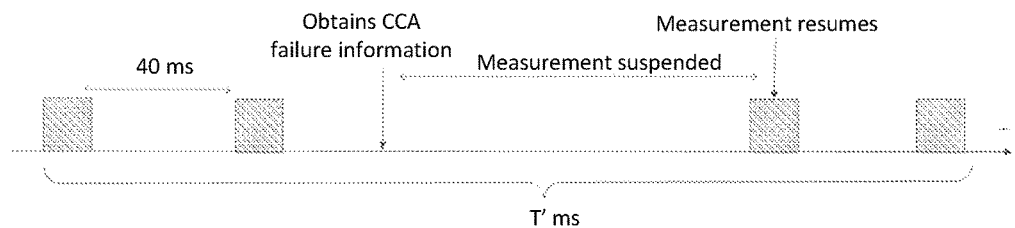
FIG. 5 illustrates adaptation by a UE of ongoing measurement activity based on obtained CCA information in accordance with further embodiments.

In yet another example, the UE may choose to suspend the ongoing measurement for some time and then resume from the last sample. In this case the total measurement period can be extended from T to T', where T'>T, to compensate for the time the measurement was suspended (see FIG. 5). Then T is the measurement period when no CCA failure occurs.

However, a UE may also choose not to extend the measurement period to obtain samples compensating for lost samples when the measurement was suspended. In such a case the UE may compensate for the loss of samples in the processing of the samples, e.g. when calculating an average value.

In yet another example, it is assumed the obtained information on CCA failure indicates that CCA failure has occurred in M out of the last N transmission attempts. The measurement adaption is similar to those described above, in that the UE may choose to drop or delay an ongoing measurement activity when M is equal to or greater than a certain threshold, Mt. On the other hand, if M is less than Mt, the UE may continue with the measurement activity as originally intended.

In yet another example, the UE receives the CCA failure information in the above examples after the measurement has been concluded and if the information indicates that the CCA failure rate, or number of CCA failures, was high during the measurement period, the UE may choose to discard the obtained measurement result.

The above examples explain adapting an on-going measurement activity, or retroactively invalidating a performed measurement activity, based on received CCA information. Similar adaptation(s) can also be made for an upcoming measurement activity, i.e. a measurement which has not started yet. In this case, the adaptation involves the UE delaying or suspending the upcoming measurement activity based the obtained CCA failure information as described in previous examples.

Figure 6:
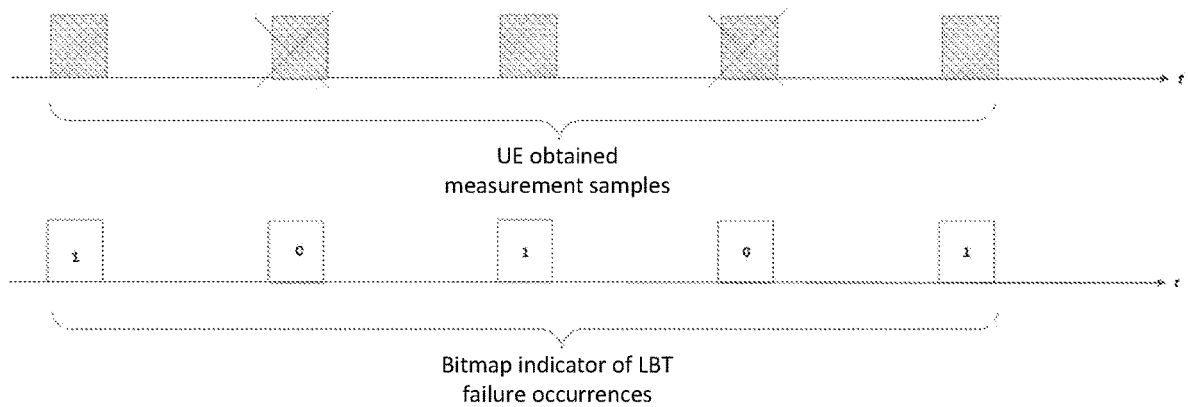
FIG. 6 illustrates adaptation by a UE of an ongoing or concluded measurement activity based on obtained bitmap information indicating CCA failure and success according to some embodiments.

In case the CCA failure information is provided using a bitmap indicator, the UE can use this information to selectively filter out or exclude certain samples of an ongoing measurement activity, or a concluded measurement activity, depending on the UE capability. The UE can compare the obtained bitmap to the list of samples it has obtained over the measurement time, and selectively exclude samples which were obtained when no transmission took place from the network side. In FIG. 6, '1' indicates CCA success and '0' means CCA failure. This information is obtained in terms of a bitmap as explained in the example in FIG. 3. Based on the comparison, the UE excludes the second and fourth measurement samples because received CCA information indicates that no transmission of the signal the UE measures on took place at those time instances.

Following are examples in which the obtained CCA information can be used in serving cell operational tasks, radio link monitoring (RLM) and beam management (BM).

Radio Link Monitoring

In a radio link monitoring procedure, the UE evaluates the quality of the radio link (typically the radio link towards the PCell, but it may also be the PSCell) based on a SNR measurement on a reference signal and compares it to a hypothetical resulting BLEB of a control channel. Based on this comparison, and some further evaluation using counters and timers, the UE detects whether the radio link is out-of-sync or in-sync. Typically, the UE performs this evaluation periodically, e.g. once every radio frame. The problem with this classical approach is that the UE assumes there is always a downlink reference signal available at the times when the UE performs the measurement. This is, however, not always the case in operation in unlicensed spectrum, as explained earlier. Upon a number of consecutive out-of-sync indications and expiry of RLF timer (e.g. timer T310), the UE declares radio link failure and turns off its transmitter. According to some embodiments, a UE may use the obtained information on CCA failure to adapt its RLF declaration process. In some embodiments, such adaptation may include restarting or extending the RLF timer, suspending the RLF timer, restarting or extending out-of-sync and/or in-sync evaluation periods, resetting out-of-sync and/or in-sync counters, adapting an out-of-sync counter, e.g. decreasing it (subtracting a certain number) to compensate for out-of-sync events which may be the result of CCA failure at the network node, suspending an out-of-sync counter, and/or adapting a threshold for when out-of-sync events trigger start of the RLF timer (e.g. increasing the threshold when the CCA failure rate is high).

For example, if the obtained CCA information indicates high LBT/CCA failure rate, then the UE may extend an on-going RLF timer or restart the RLF timer. Alternatively, the UE may reset an out-of-sync counter. The advantage of this type of adaptation is that RLF failure based on incorrect evaluation may be avoided. Thus, a premature RLF declaration may be avoided when the UE in fact has good radio link quality with the serving cell (e.g. PCell).

Beam Management

The beam management procedure involves UE link recovery and measurement reporting. The link recovery procedure can be divided into beam failure detection (BFD) and candidate beam detection (CBD). In order to detect beam failure, the UE is required to measure a downlink reference signal (e.g. SSB or CSI-RS) and evaluate its quality with respect to a hypothetical BLER target. If the measured quality is below a certain threshold (e.g. 10% hypothetical PDCCH BLER), a beam failure is detected or declared. Thereafter the UE starts performing candidate beam detection, which involves the UE detecting a beam, measuring the quality of the received signal of that beam and selecting/reporting the beam provided that the measured quality is greater than a certain threshold. Such measurements are based on downlink reference signals, such as SSB, CSI-RS, etc. However, there may not be any reference signal present due to CCA failures, in which case the UE may end up declaring beam failure incorrectly and may even not detect a candidate beam even though one or more candidate beams are present and possible for the UE to detect (when it is transmitted). This problem may be avoided by the UE making use of the received CCA operational information (e.g. CCA failure information and/or CCA success information). More specifically, the UE, based on the received CCA failure information, may extend the beam failure detection evaluation time with respect to reference signal evaluation time, i.e. the UE is allowed longer time to detect beam failure compared to the case when no CCA failure occurs. The reference evaluation time includes the period over which the beam failure detection is performed when no CCA failure occurs.

In some embodiments, the UE may, based on the CCA failure information, restart the beam failure detection process, e.g. by restarting/resetting of a timer associated with the beam detection process.

In some embodiments, the UE may, based on the CCA failure information, restart the candidate beam detection process, e.g. by restarting of a timer associated with candidate beam discovery.

In some embodiments, the UE may, based on the CCA failure information, extend the candidate beam detection process, e.g. by extending a timer associated with candidate beam discovery.

In some embodiments, the UE may, based on the CCA failure information, adapt, e.g. increase, a threshold for triggering beam failure detection/declaration (where the threshold e.g. may be expressed in terms of number of measurement samples implying a hypothetical BLER below a threshold).

In some embodiments, the UE may, based on the CCA failure information, adapt, e.g. increase, a threshold for triggering start of a timer for beam failure detection/declaration (where the threshold e.g. may be expressed in terms of number of measurement samples implying a hypothetical BLER below a threshold).

In some embodiments, the UE may, based on the CCA failure information, postpone the candidate beam detection process, e.g. by performing the candidate beam detection at a later time instance, such as when the CCA failure rate or level falls below certain threshold (e.g. CCA failure rate becomes less than 30%). In the meantime, the UE may keep using the beam whose poor channel quality measurements triggered beam failure declaration, despite the fact that the channel quality is poor and the UE's communication with the base station controlling the cell may be hampered.

In one example, the UE may also assume different thresholds for the hypothetical PDCCH BLER target and/or minimum signal strength/quality threshold (e.g. L1-RSRP threshold) for candidate beam detection when the obtained CCA failure information indicates a high rate of LBT failures.

Cell Reselection

In some embodiments, a UE may also use obtained CCA failure information in its cell reselection decisions (e.g. when the UE is in RRC_INACTIVE or RRC_IDLE state). For instance, if the obtained information indicates a high CCA failure rate, the UE may choose to reselect to another cell, possibly on another carrier frequency, or to reselect to another RAT, e.g. to NR or LTE operating in licensed spectrum. Such reselection may only be performed if there is another cell to reselect to which offers channel quality and/or channel occupancy that is acceptable or at least better than in the current cell.

An alternative to letting indication of high CCA failure rate trigger cell reselection is that such an indication can make the UE adapt the reselection thresholds received from the network node in the serving cell, thereby creating a bias to reselect to another cell (i.e. to leave the cell with high downlink CCA failure rate).

Figure 7:
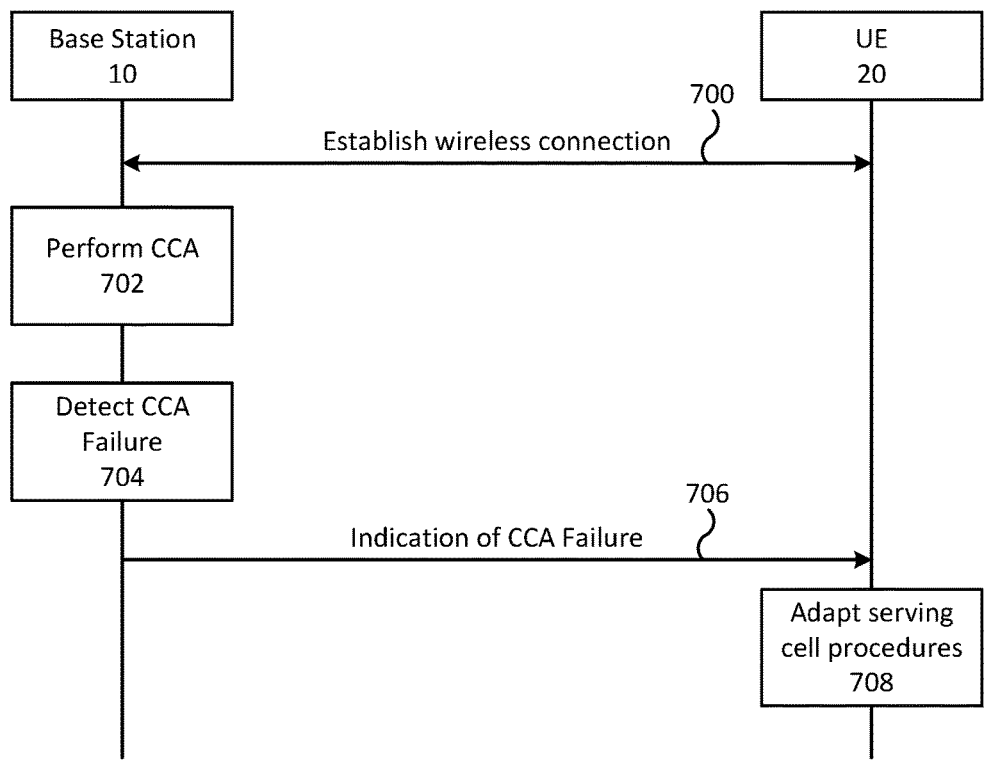
FIG. 7 illustrates message flows between a base station and a UE according to some embodiments.

FIG. 7 illustrates message flows of RAN node (e.g., base station 10) and a UE 20 according to some embodiments. As shown therein, a base station 10 establishes a wireless connection 700 with the UE 20 using licensed and/or unlicensed spectrum. The base station 10 performs a CCA attempt 702 on unlicensed spectrum to determine if a wireless channel to the UE 20 on an unlicensed channel. At block 704, the base station 10 detects CCA failure due, for example, to occupancy of the channel. The base station 10 then transmits an indication 706 of CCA failure to the UE 20 as described above. In response to the CCA failure information, the UE 20 adapts one or more of its serving cell procedures as described above (block 708).

Figure 8:
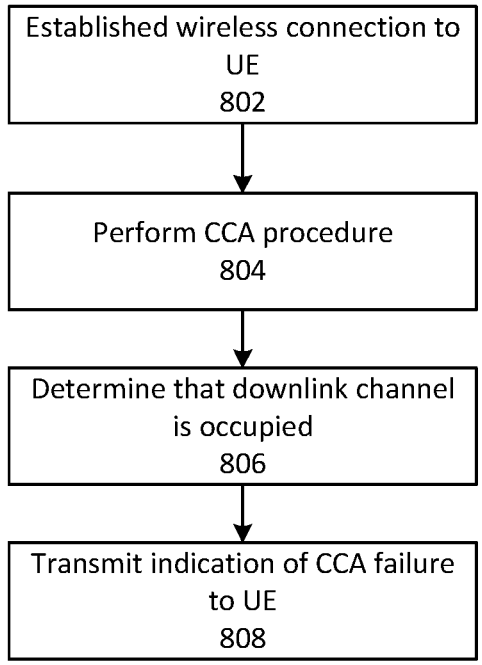
FIG. 8 is a flowchart of operations performed by a base station according to some embodiments.

FIG. 8 is a block diagram of operations of a RAN node according to some embodiments. Referring to FIG. 8, a RAN node establishes a wireless connection to a UE (block 802). The RAN node performs a clear channel assessment, CCA, on a downlink channel (block 804), and determines, based on the CCA, whether or not the downlink channel is occupied (block 806). The RAN node transmits a message to a wireless device (block 808). The message includes an indication of a CCA failure that was based at least in part on the determination that the downlink channel was occupied. The wireless channel may include one or more of unlicensed spectrum, shared spectrum, spectrum subject to a CCA procedure, spectrum subject to a listen before talk, LBT, procedure and/or spectrum for contention based operation.

In some embodiments, the indication of failure of the CCA procedure includes a bitmap indicating failed and successful CCA instances, such as the bitmap 302 illustrated in FIG. 3. The bitmap indicates locations of resources associated with CCA failure and locations of resources, such as time resources, associated with CCA success.

The indication of the CCA failure may be transmitted via at least one of a Physical Broadcast Channel, PBCH, one or more payload bits outside a master information block, MIB, of a PBCH, and/or a System Information Block, SIB, and may include at least one of a single bit, more than one bit, beam related information, information related to a direction of a beam, a number of CCA failures that have occurred, and/or a ratio of successful to failed CCA attempts.

In some embodiments, the indication of the CCA failure is sent in response to occurrence of a triggering event. In some embodiments, the method further includes obtaining user data, and forwarding the user data to the wireless device via the downlink channel.

Figure 10:
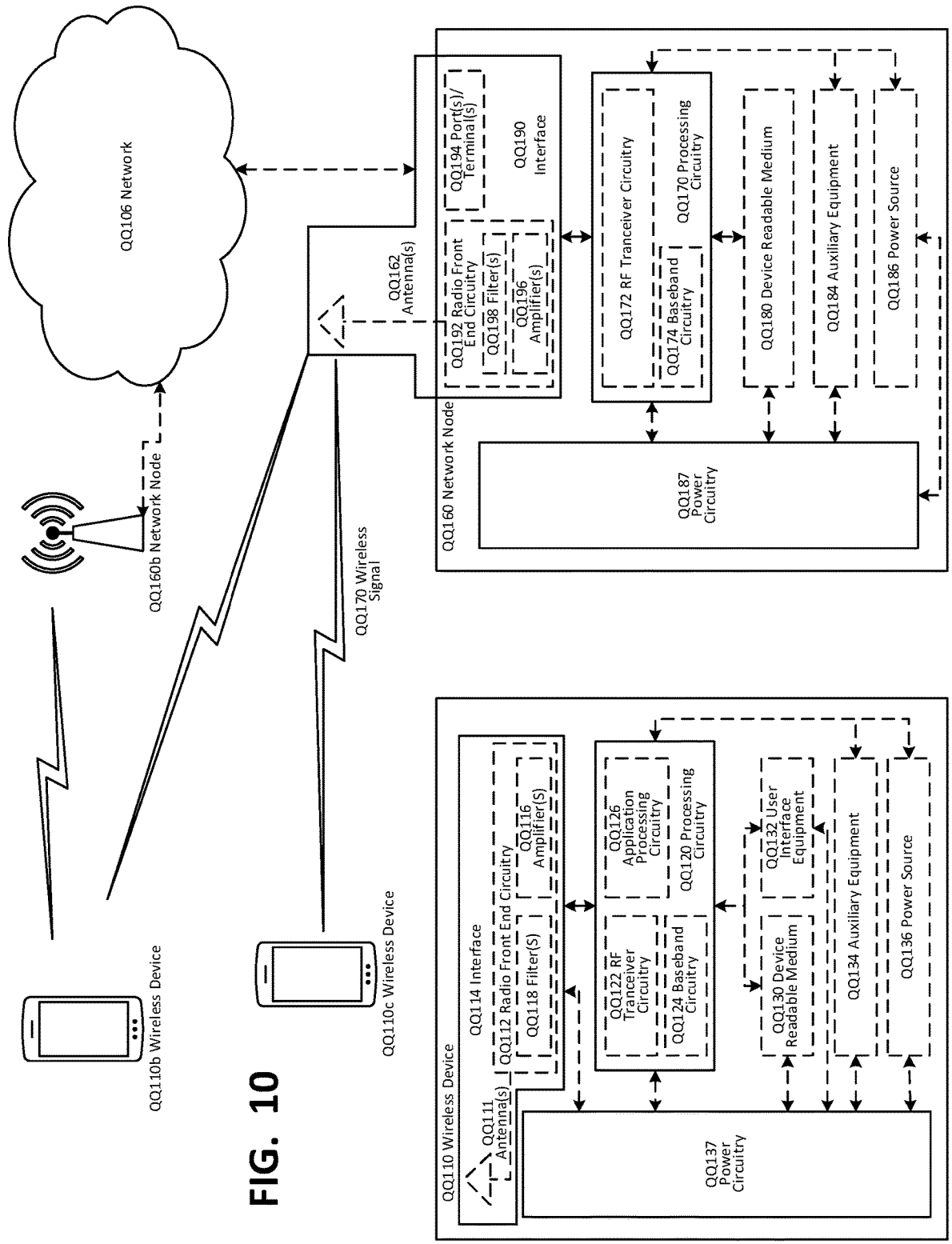
FIG. 10 is a block diagram of a wireless network in accordance with some embodiments.

Referring to FIGS. 8 and 10, a RAN node QQ160 according to some embodiments includes processing circuitry QQ170, and memory QQ180 coupled with the processing circuitry. The memory includes instructions that when executed by the processing circuitry causes the RAN node to perform operations including performing a clear channel assessment, CCA, on a downlink channel (block 804), determining, based on the CCA, whether or not the downlink channel is occupied (block 806), and transmitting a message to the wireless device including an indication of a CCA failure, wherein the CCA failure based at least in part on the determination that the downlink channel was occupied (block 808).

Some embodiments provide a RAN node QQ160 adapted to perform operations including performing a clear channel assessment, CCA, on a downlink channel (block 804), determining, based on the CCA, whether or not the downlink channel is occupied (block 806), and transmitting a message to the wireless device, the message including an indication of a CCA failure, the CCA failure based at least in part on the determination that the downlink channel was occupied (block 808).

Figure 9:
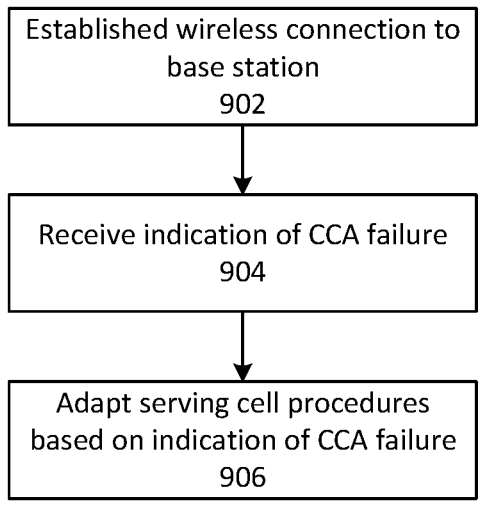
FIG. 9 is a flowchart of operations performed by a UE according to some embodiments.

FIG. 9 is a block diagram of operations of a UE according to some embodiments. Referring to FIG. 9, a wireless device establishes a wireless connection to a radio access network (RAN) node, such as a base station serving the wireless device (block 902). The wireless device receives a message from the RAN node including an indication of failure of a clear channel assessment, CCA, procedure by the RAN node on a wireless channel (block 904), and adapts a serving cell procedure in response to the message (block 906).

The indication of failure of the CCA procedure may include a bitmap indicating failed and successful CCA instances, such as the bitmap 302 in FIG. 3. The bitmap may indicate locations of resources associated with CCA failure and locations of resources, such as time resources, associated with CCA success.

The wireless device may adapt the serving cell procedure by adapting monitoring and/or measurements on the wireless channel and/or adapting monitoring and/or reporting on an operational status of the wireless device. Adapting the serving cell procedure may include selectively filtering measurements based on the bitmap.

In some embodiments, the wireless device may adapt the serving cell procedure by comparing the bitmap to a list of samples obtained over a measurement time interval and selectively excluding samples which were obtained based on contents of the bit map.

In some embodiments, the wireless device may adapt the serving cell procedure by adapting a radio link failure, RLF, declaration process, wherein adapting the RLF declaration process includes performing at least one of restarting or extending an RLF timer, suspending the RLF timer, restarting or extending an out-of-sync and/or in-sync evaluation period, resetting an out-of-sync and/or in-sync counter, changing a value of the out-of-sync counter to compensate for out-of-sync events that result from CCA failure at the RAN node, suspending the out-of-sync counter, and/or adapting a threshold for when out-of-sync events trigger a start of the RLF timer.

In some embodiments, the wireless device may adapt a beam management procedure by performing at least one of extending a beam failure detection evaluation time with respect to a reference signal evaluation time, restarting a beam failure detection process, restarting a candidate beam detection process, extending the candidate beam detection process, adapting a threshold for triggering a beam failure detection or declaration, adapting a threshold for triggering start of a timer for beam failure detection or declaration, and/or postponing the candidate beam detection process.

In some embodiments, the wireless device may modify a cell measurement procedure based on the indication of the CCA failure received from the RAN node, such as by performing at least one of modifying radio link monitoring, beam management, cell change or power control, stopping or preventing a measurement based on the indication of CCA failure indicating a plurality of failures, or stopping future cell measurements for a predetermined period of time. In some embodiments, the wireless device may resume cell measurement from a last sample prior to stopping cell measurements.

The indication of CCA failure may include one or more of beam related information, information related to a direction of a beam, a number of CCA failures that have occurred, and/or a ratio of successful to failed CCA attempts.

In some embodiments, the wireless device may provide user data, and forward the user data to a host computer via transmission to the RAN node.

Referring to FIGS. 9 and 10, a wireless device QQ110 according to some embodiments includes processing circuitry QQ120 and a memory QQ130 coupled with the processing circuitry. The memory includes instructions that when executed by the processing circuitry causes the communication device to perform operations including receiving a message from a RAN node serving the wireless device, the message including an indication of a failure of a clear channel assessment, CCA, procedure by the RAN node on a wireless channel (block 904), and adapting a serving cell procedure in response to the message (block 906).

Some embodiments provide a wireless device QQ110 adapted to perform operations including receiving a message from a radio access network, RAN, node serving the wireless device, the message including an indication of a failure of a clear channel assessment, CCA, procedure by the RAN node on a wireless channel (block 904), and adapting a serving cell procedure in response to the message (block 906).

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (U MTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 10 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 11:
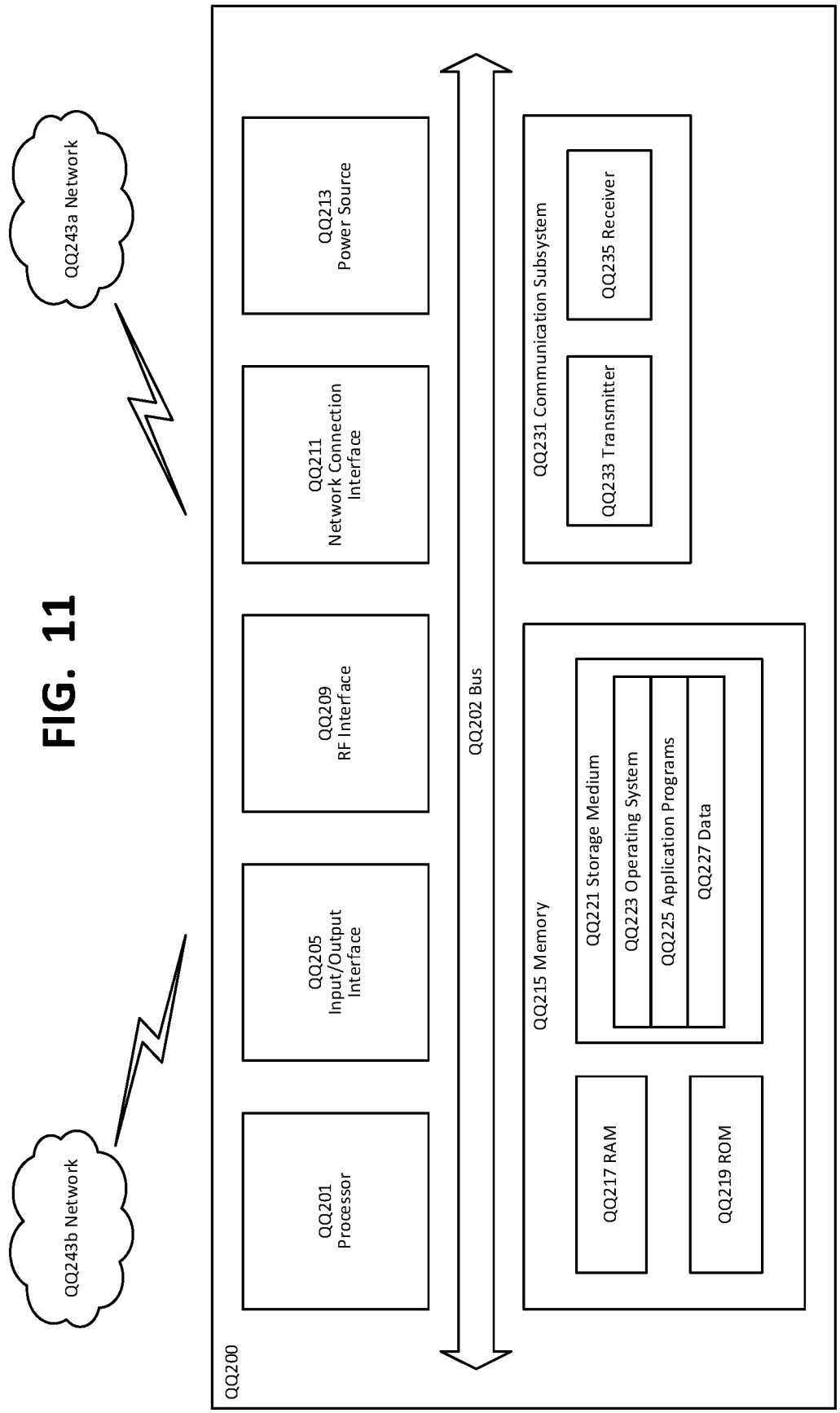
FIG. 11 is a block diagram of a wireless device in accordance with some embodiments

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 11, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 12:
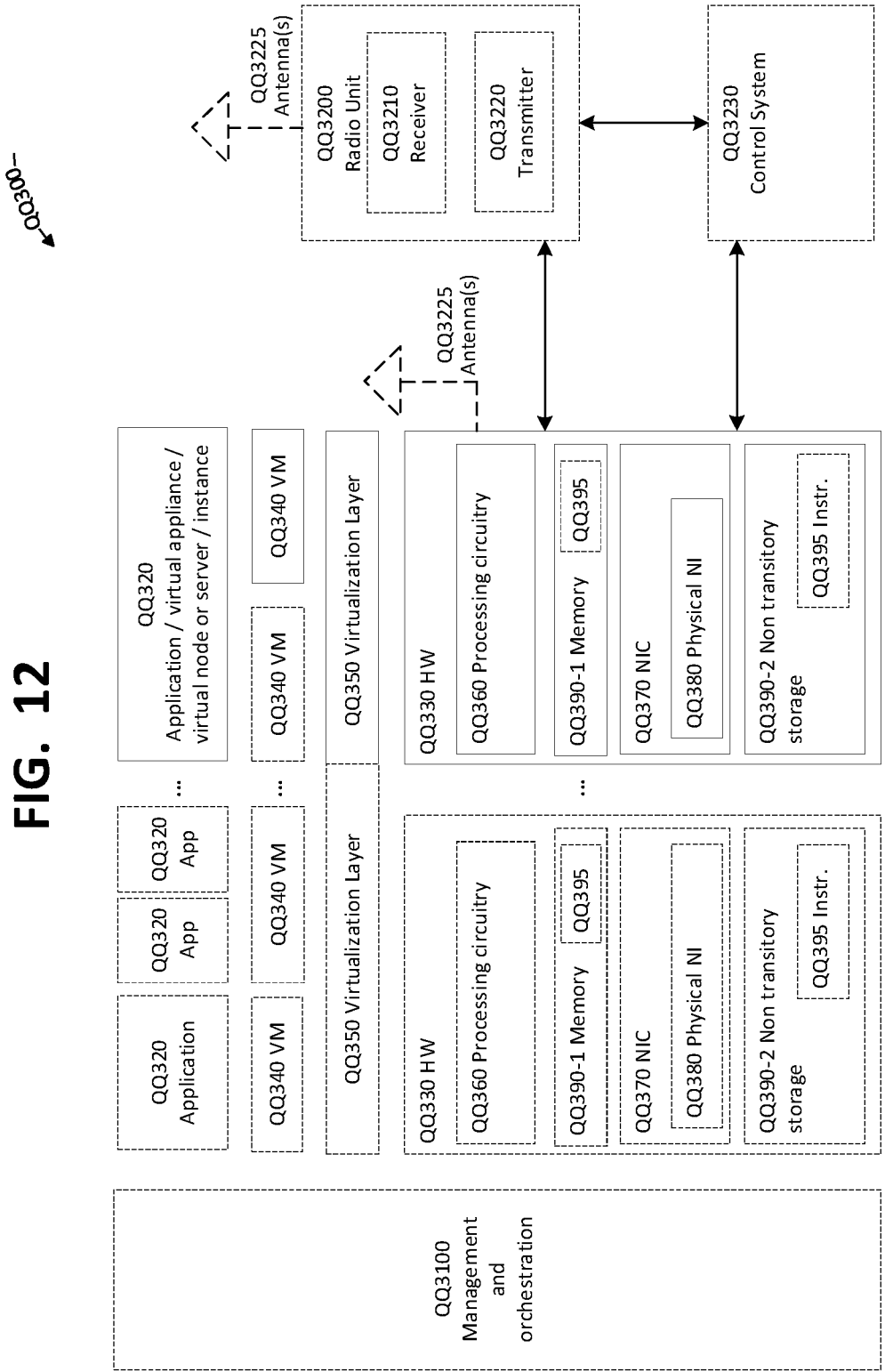
FIG. 12 is a block diagram of a virtualization environment in accordance with some embodiments.

FIG. 12 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 12, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 12.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 13:
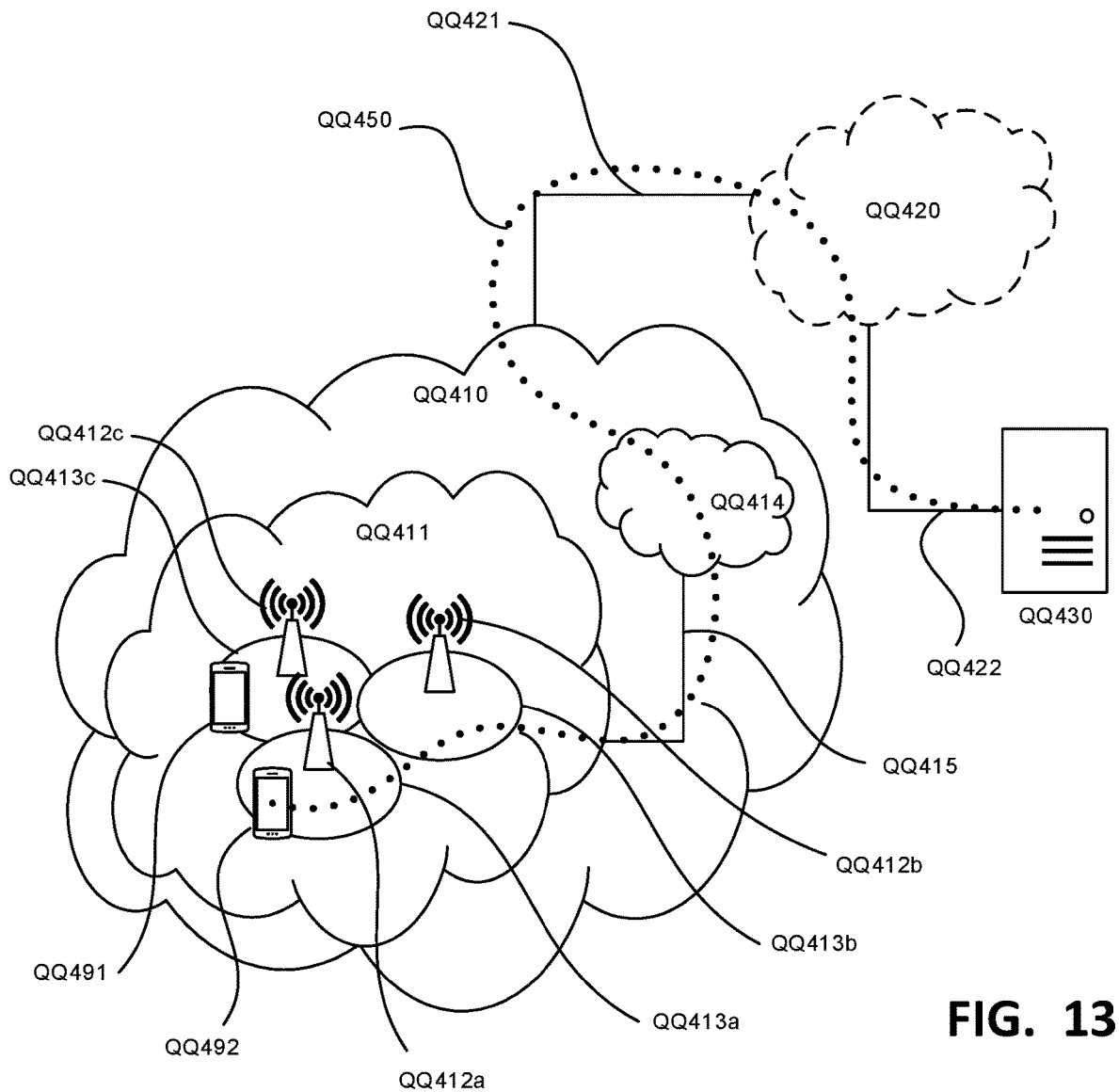
FIG. 13 is a block diagram of a telecommunication network connected via an intermediate network to a host computer in accordance with some embodiments.

With reference to FIG. 13, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 13 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 14. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 14) served by base station QQ520. Communication interface QQ526 may be configured to facilitate connection QQ560 to host computer QQ510. Connection QQ560 may be direct or it may pass through a core network (not shown in FIG. 14) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 14:
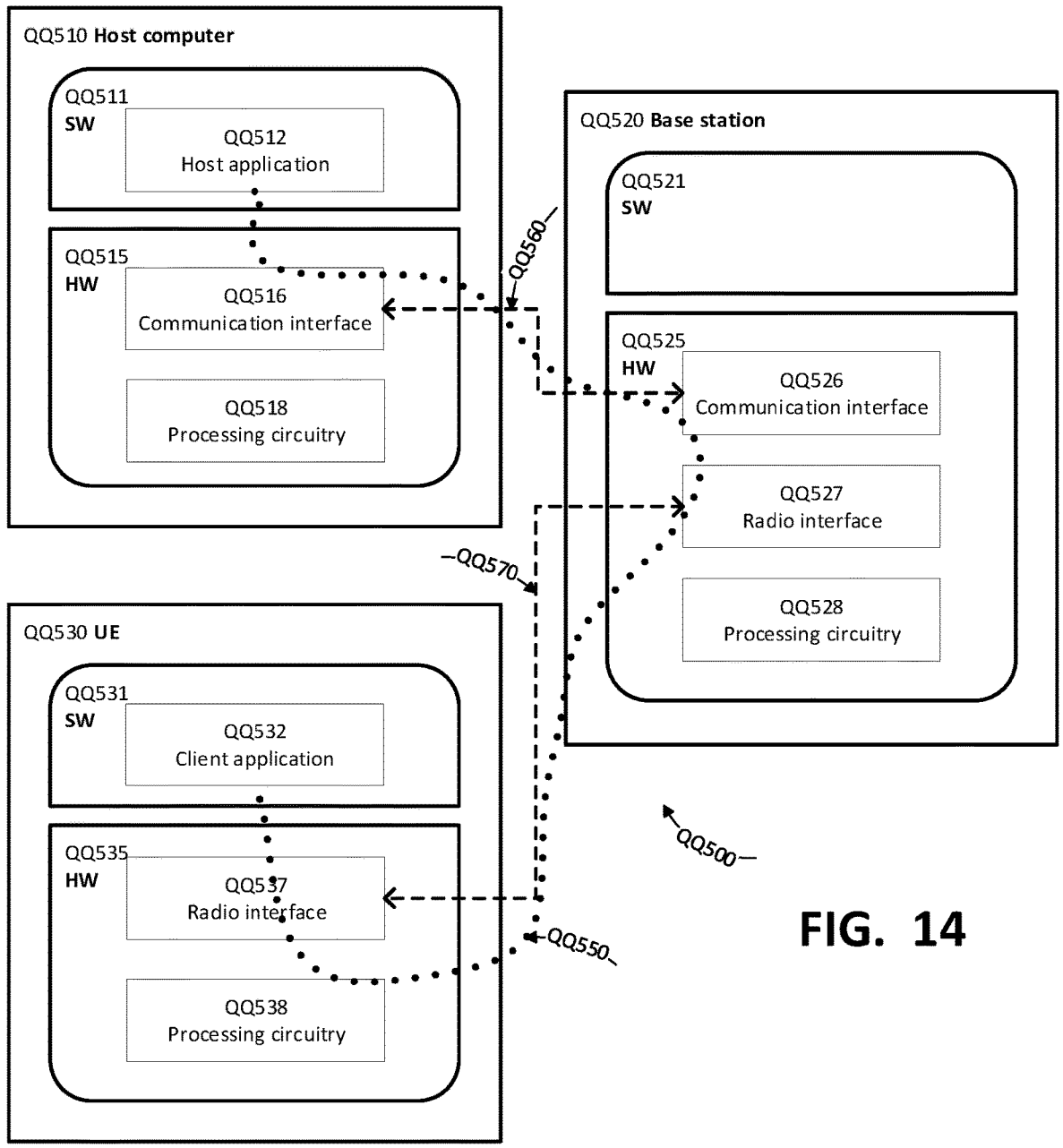
FIG. 14 is a block diagram of a host computer communicating via a base station with a wireless device over a partially wireless connection in accordance with some embodiments.

It is noted that host computer QQ510, base station QQ520 and UE QQ530 illustrated in FIG. 14 may be similar or identical to host computer QQ430, one of base stations QQ412a, QQ412b, QQ412c and one of UEs QQ491, QQ492 of FIG. 13, respectively. This is to say, the inner workings of these entities may be as shown in FIG. 14 and independently, the surrounding network topology may be that of FIG. 13.

In FIG. 14, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the UE ability to perform measurement evaluation, which can in turn help the UE to make more correct operational decisions such as RLF declaration, beam failure detection, cell change decisions etc. This can improve the UE performance as well as overall network performance thereby improving the ability for the UE to receive data and information from various service providers.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 15:
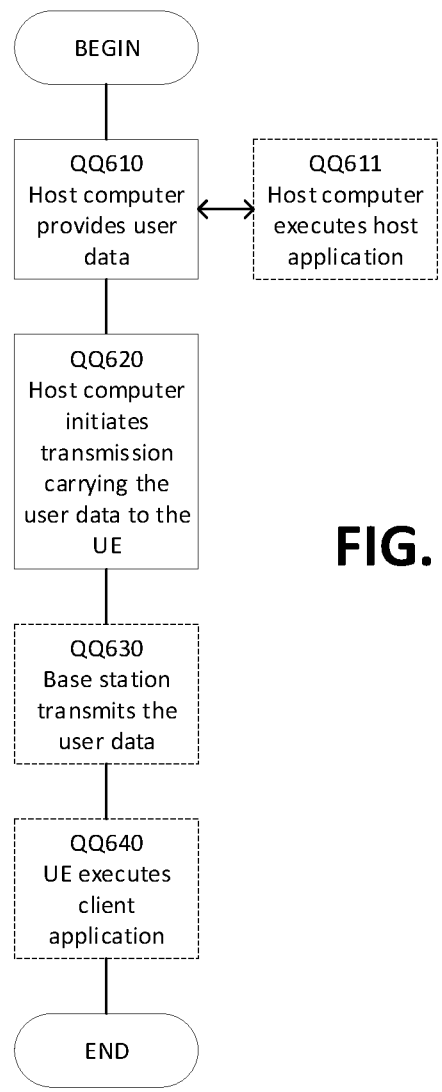
FIG. 15 is a block diagram of methods implemented in a communication system including a host computer, a base station and a wireless device in accordance with some embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 16:
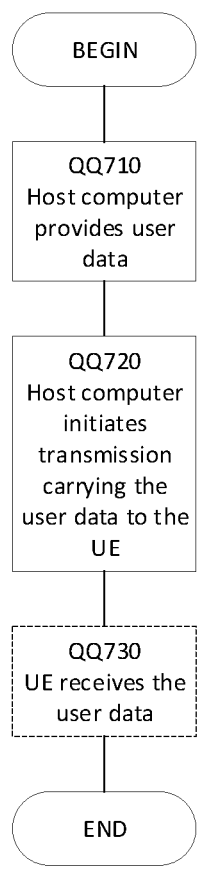
FIG. 16 is a block diagram of methods implemented in a communication system including a host computer, a base station and a wireless device in accordance with some embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 17:
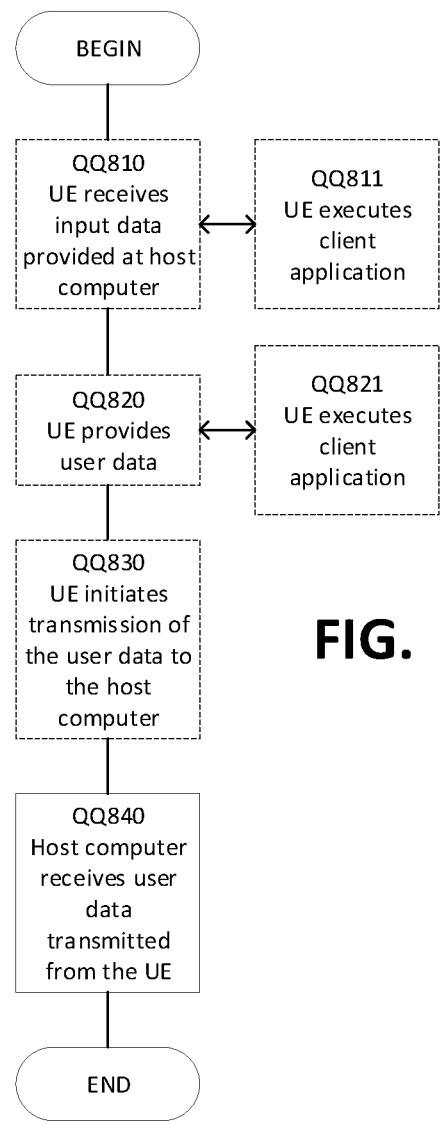
FIG. 17 is a block diagram of methods implemented in a communication system including a host computer, a base station and a wireless device in accordance with some embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 18:
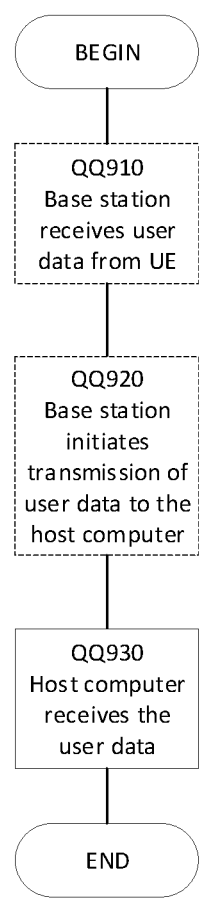
FIG. 18 is a block diagram of methods implemented in a communication system including a host computer, a base station and a wireless device in accordance with some embodiments.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step QQ910 (which may be optional), in accordance with the teachings of the embodiments described throughout this disclosure, the base station receives user data from the U E. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 19:
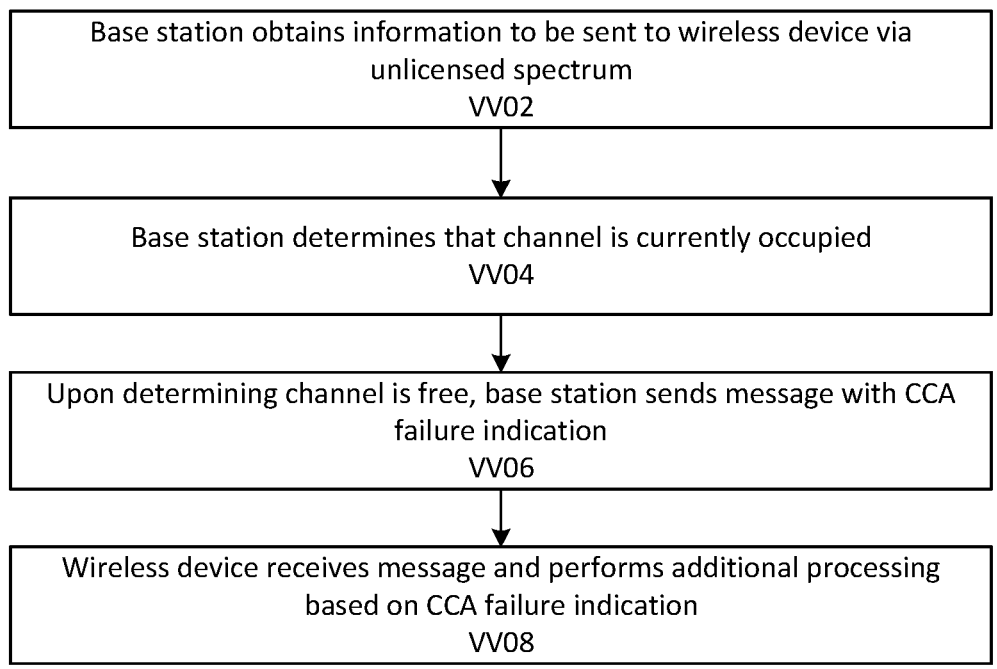
FIG. 19 is a flowchart of operations performed by a base station and/or a wireless device according to some embodiments.

FIG. 19 depicts a method in accordance with particular embodiments, the method begins at step VV02 with a base station, such as network node QQ160, obtains information to be sent to wireless device, such as WD QQ110, via unlicensed spectrum. The information may be data, control information, signalling, or any other type of information that needs to be communicated from the base station to the wireless device.

At step VV04 the base station determines that the downlink channel is currently occupied. Because the downlink channel is occupied the base station is unable to send the information. Therefore the base station has to wait for the downlink channel to be open or available.

At step VV06, upon determining the downlink channel is free, the base station sends a message with a CCA Failure indication. The CCA Failure indication alerts the wireless device that the base station was unbale to send information because the downlink channel was previously busy. The CCA Failure indication may be sent along with the information the base station obtained at step VV02 or it may be sent separately. The CCA Failure indication may comprise any of the information discussed above as possible information related to one or more CCA failures. The CCA Failure indication may sent using any of the transmission messages or message elements discussed above.

At step VV08 the wireless device receives the message with the CCA failure indication and performs additional processing based on the information from the CCA Failure indication.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Embodiments

1. A method performed by a wireless device for adjusting the serving cell UE measurement procedure, the method comprising:
   establishing a wireless connection with a base station using unlicensed spectrum;
   receiving a first message comprising an indication of a CCA failure by the base station when attempting to send a prior message to the wireless device; and
   modifying a cell measurement procedure based on the indication of the CCA failure received from the base station.
2. The method of 1 wherein the indication of the CCA failure is received via a Physical Broadcast Channel (PBCH).
3. The method of any of 1-2 wherein the indication of the CCA failure is received in one or more payload bits outside a MIB of a PBCH.
4. The method of 1 wherein the indication of the CCA failure is receive via a System Information Block (SIB).
5. The method of any of 1-4 wherein the indication of the CCA failure comprises a single bit.
6. The method of any of 1-5 wherein the indication of the CCA failure comprises more than one bit.
7. The method of any of 1-6 wherein the indication of the CCA failure comprises beam related information.
8. The method of any of 7 wherein the beam related information comprises information related to a direction of a beam.
9. The method of any of 1-8 wherein the indication of the CCA failure comprises a number of CCA failures that have occurred.
10. The method of any of 1-9 wherein the indication of the CCA failure comprises a ratio of successful to failed CCA attempts.
11. The method of any of 1-10 wherein the indication of the CCA failure is sent only upon a triggering event having occurred.
12. The method of any of 1-11 wherein modifying a cell measurement comprises modifying radio link monitoring, beam management, cell change or power control.
13. The method of any of 1-12 wherein modifying a cell measurement comprises stopping or preventing a measurement based on the indication of the CCA failure indicating a high number of failures.
14. The method of 13 wherein preventing a cell measurement comprises stopping future measurements for a specified period of time.
15. The method of 14 further comprising resuming cell measurement from the last sample prior to stopping cell measurements.
16. The method of any of 1-15 wherein modifying a cell measurement comprises discarding one or more measurements based on the indication of the CCA failure.
17. The method of any of 1-16 wherein modifying a cell measurement comprises using a bitmap provided in the indication of the CCA failure to either include or exclude particular measurement samples.
18. The method of any of 1-17 wherein modifying a cell measurement comprises adapting a radio link monitoring function according to any of the listed actions under the heading Radio-Link Monitoring provided above.
19. The method of any of 1-18 wherein modifying a cell measurement comprises performing any of the actions listed under the heading Beam Management provided above.
20. The method of any of 1-19 wherein modifying a cell measurement comprises choosing another cell based upon the indication of the CCA failure.
21. The method of any of the previous embodiments, further comprising:
   providing user data; and
   forwarding the user data to a host computer via the transmission to the base station.
22. A method performed by a base station for adjusting the serving cell UE measurement procedure, the method comprising:
   obtaining information to be sent to a wireless device via a wireless connection using unlicensed spectrum;
   determining a downlink to the wireless device is occupied;
   determining that the previously occupied downlink is now available;
   transmitting a message to the wireless device, the message comprising an indication of a CCA failure, the CCA failure based at least in part on the determination that the downlink to the wireless device was occupied.

23. The method of embodiment 22, wherein the base station is configured to perform operations according to any of embodiments 2 to 21.

24. The method of embodiment 22 or 23, further comprising:
obtaining user data; and
forwarding the user data to a host computer or a wireless device.

25. A wireless device for adjusting the serving cell UE measurement procedure, the wireless device comprising:
processing circuitry configured to perform any of the steps of any of embodiments 1 to 21; and
power supply circuitry configured to supply power to the wireless device.

26. A base station for adjusting the serving cell UE measurement procedure, the base station comprising:
processing circuitry configured to perform any of the steps of any of embodiments 22-24;
power supply circuitry configured to supply power to the base station.

27. A user equipment (UE) for adjusting the serving cell UE measurement procedure, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any embodiments 1 to 21;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

28. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of embodiments 22-24.

29. The communication system of embodiment 28 further including the base station.

30. The communication system of embodiment 28 or 29, further including the UE, wherein the UE is configured to communicate with the base station.

31. The communication system of any of embodiments 28 to 30, wherein:
the processing circuitry of the host computer is configured to execute a host application, thereby providing the user data; and
the UE comprises processing circuitry configured to execute a client application associated with the host application.

32. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of embodiments 22-24.

33. The method of embodiment 32, further comprising, at the base station, transmitting the user data.

34. The method of the embodiment 32 or 33, wherein the user data is provided at the host computer by executing a host application, the method further comprising, at the UE, executing a client application associated with the host application.

35. A user equipment (UE) configured to communicate with a base station, the UE comprising a radio interface and processing circuitry configured to performs any of embodiments 31 to 34.

36. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of embodiments 1-21.

37. The communication system of embodiment 36, wherein the cellular network further includes a base station configured to communicate with the UE.

38. The communication system of embodiment 36 or 37, wherein:
the processing circuitry of the host computer is configured to execute a host application, thereby providing the user data; and
the UE's processing circuitry is configured to execute a client application associated with the host application.

39. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of embodiments 1-21.

40. The method of embodiment 39, further comprising at the UE, receiving the user data from the base station.

41. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of embodiments 1-21.

42. The communication system of embodiment 41, further including the UE.

43. The communication system of embodiment 41 or 42, further including the base station, wherein the base station comprises a radio interface configured to communicate with the UE and a communication interface configured to forward to the host computer the user data carried by a transmission from the UE to the base station.

44. The communication system of any of embodiments 41 to 43, wherein:
the processing circuitry of the host computer is configured to execute a host application; and
the UE's processing circuitry is configured to execute a client application associated with the host application, thereby providing the user data.

45. The communication system of any of embodiments 41 to 44, wherein:
   the processing circuitry of the host computer is configured to execute a host application, thereby providing request data; and
   the UE's processing circuitry is configured to execute a client application associated with the host application, thereby providing the user data in response to the request data.
46. A method implemented in a communication system including a host computer, a base station and a user equipment (UE), the method comprising:
   at the host computer, receiving user data transmitted to the base station from the UE, wherein the UE performs any of the steps of any of embodiments 1-21.
47. The method of embodiment 46, further comprising, at the UE, providing the user data to the base station.
48. The method of the embodiment 46 or 47, further comprising:
   at the UE, executing a client application, thereby providing the user data to be transmitted; and
   at the host computer, executing a host application associated with the client application.
49. The method of any of embodiments 46 to 48, further comprising:
   at the UE, executing a client application; and
   at the UE, receiving input data to the client application, the input data being provided at the host computer by executing a host application associated with the client application,
   wherein the user data to be transmitted is provided by the client application in response to the input data.
50. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of embodiments 22-24.
51. The communication system of embodiment 50 further including the base station.
52. The communication system of embodiment 50 or 51, further including the UE, wherein the UE is configured to communicate with the base station.
53. The communication system of any of embodiments 50 to 52, wherein:
   the processing circuitry of the host computer is configured to execute a host application;
   the UE is configured to execute a client application associated with the host application, thereby providing the user data to be received by the host computer.
54. A method implemented in a communication system including a host computer, a base station and a user equipment (UE), the method comprising:
   at the host computer, receiving, from the base station, user data originating from a transmission which the base station has received from the UE, wherein the UE performs any of the steps of any of embodiments 1-21.
55. The method of embodiment 54, further comprising at the base station, receiving the user data from the UE.
56. The method of embodiment 53 or 54, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
1×RTT CDMA2000 1× Radio Transmission Technology
3GPP 3rd Generation Partnership Project
5G 5th Generation
ABS Almost Blank Subframe
ACK Acknowledgment
AP Access Point
ARQ Automatic Repeat Request
ASN.1 Abstract Syntax Notation One
AWGN Additive White Gaussian Noise
BCCH Broadcast Control Channel
BCH Broadcast Channel
BLER Block Error Rate
BWP Bandwidth Part
CA Carrier Aggregation
CAPC Channel Access Priority Class
CCA Clear Channel Assessment
CC Carrier Component
CCCH SDU Common Control Channel SDU
CDMA Code Division Multiple Access
CGI Cell Global Identifier
CIR Channel Impulse Response
COT Channel Occupancy Time
CP Cyclic Prefix
CPICH Common Pilot Channel
Ec/No Received energy per chip divided by the power density in the band
CQI Channel Quality information
C-RNTI Cell RNTI
CSI Channel State Information
CRS Cell Specific Reference Signals
CSI-RS Channel State Information-Reference Signal
CSMA Carrier Sense Multiple Access
CWS Contention Window Size
DAS Distributed Antenna System
DCCH Dedicated Control Channel
DCI Downlink Control Information
DL Downlink
DM Demodulation
DMRS Demodulation Reference Signal
DMTC DRS Measurement Time Configuration
DRS Discovery Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
ED Energy Detection
EDGE Enhanced Data rates for GSM Evolution
eLAA Enhanced License Assisted Access
EN-DC E-UTRAN New Radio Dual Connectivity
eNB E-UTRAN NodeB
eMBB enhanced Mobile Broadband
ePDCCH enhanced Physical Downlink Control Channel
E-SMLC evolved Serving Mobile Location Center
E-UTRA Evolved UTRA
E-UTRAN Evolved UTRAN
ETSI European Telecommunications Standards Institute
FDD Frequency Division Duplex
feLAA Further Enhanced License Assisted Access
FFS For Further Study
GC-PDCCH Group Common PDCCH
GERAN GSM EDGE Radio Access Network gNB Base station in NR
GNSS Global Navigation Satellite System
GPRS General Packet Radio Service
GSM Global System for Mobile communication
HARQ Hybrid Automatic Repeat Request
HO Handover
HSPA High Speed Packet Access
HRPD High Rate Packet Data
IS In Sync
LAA License Assisted Access
LBT Listen-Before-Talk
LOS Line of Sight
LPP LTE Positioning Protocol
LTE Long-Term Evolution
MAC Medium Access Control
MAC CE MAC Control Element
MBMS Multimedia Broadcast Multicast Services
MBSFN Multimedia Broadcast multicast service Single Frequency Network
MBSFN ABS MBSFN Almost Blank Subframe
MCOT Maximum Channel Occupancy Time
MDT Minimization of Drive Tests
MHz Megahertz
MIB Master Information Block
MME Mobility Management Entity
ms millisecond
μs microsecond
MSC Mobile Switching Center
NGC Next Generation Core network
NPDCCH Narrowband Physical Downlink Control Channel
NR New Radio
NR-U NR Unlicensed (NR operation in unlicensed spectrum)
OCNG OFDMA Channel Noise Generator
OFDM Orthogonal Frequency Division Multiplexing
OFDMA Orthogonal Frequency Division Multiple Access
OOS Out of Sync
OSS Operations Support System
OTDOA Observed Time Difference of Arrival
O&M Operation and Maintenance
PCell Primary Cell
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PDU Protocol Data Unit
PSCell Primary Secondary Cell
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
QCI QoS Class Indicator
QoS Quality of Service
RAN Radio Access Network
RAT Radio Access Technology
RLC Radio Link Control
RLF Radio Link Failure
RLM Radio Link Management or Monitoring
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power/Reference Signal Received Power
RSRQ Reference Signal Received Quality/Reference Symbol Received Quality
RSSI Received Signal Strength Indicator
RSTD Reference Signal Time Difference
SCH Synchronization Channel
SCS Subcarrier Spacing
SCell Secondary Cell
UCI Uplink Control Information
UE User equipment
UL Uplink
WCDMA Wideband Code Division Multiple Access
SDAP Service Data Adaptation Protocol
SDU Service Data Unit
SFN System Frame Number
SGW Serving Gateway
SI System Information
SIB System Information Block
SINR Signal to Interference and Noise Ratio
SMTC SS/PBCH Block Measurement Time Configuration
SNR Signal to Noise Ratio
SON Self Optimized Network
SS Synchronization Signal
SSB Synchronization Signal Block
SSS Secondary Synchronization Signal
TDD Time Division Duplex
TDOA Time Difference of Arrival
TOA Time of Arrival
TS Technical Specification
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device, the method comprising:
receiving a message from a radio access network, RAN, node serving the wireless device, the message comprising an indication of failure of a clear channel assessment, CCA, procedure by the RAN node on a wireless channel wherein the indication of failure of the CCA procedure comprises a bitmap indicating locations of resources associated with CCA failure and locations of resources associated with CCA success; and
adapting a serving cell procedure in response to the message wherein adapting the serving cell procedure comprises selectively filtering measurements based on the bitmap.

2. The method of claim 1, further comprising establishing a wireless connection with the RAN node using a wireless channel before receiving the message.

3. The method of claim 1, wherein adapting the serving cell procedure comprises adapting monitoring and/or measurements on the wireless channel.

4. The method of claim 1, wherein adapting the serving cell procedure comprises comparing the bitmap to a list of samples obtained over a measurement time interval and selectively excluding samples which were obtained based on contents of the bitmap.

5. The method of claim 1, wherein adapting the serving cell procedure comprises adapting a radio link failure, RLF, declaration process, wherein adapting the RLF declaration process comprises performing at least one of:
   restarting or extending an RLF timer;
   suspending the RLF timer;
   restarting or extending an out-of-sync and/or in-sync evaluation period;
   resetting an out-of-sync and/or in-sync counter;
   changing a value of the out-of-sync counter to compensate for out-of-sync events that result from CCA failure at the RAN node;
   suspending the out-of-sync counter; and/or
   adapting a threshold for when out-of-sync events trigger a start of the RLF timer.

6. The method of claim 1, wherein adapting the serving cell procedure comprises adapting a beam management procedure.

7. The method of claim 6, wherein adapting the beam management procedure comprises performing at least one of:
   extending a beam failure detection evaluation time with respect to a reference signal evaluation time;
   restarting a beam failure detection process;
   restarting a candidate beam detection process;
   extending the candidate beam detection process;
   adapting a threshold for triggering a beam failure detection or declaration;
   adapting a threshold for triggering start of a timer for beam failure detection or declaration; and/or
   postponing the candidate beam detection process.

8. The method of claim 1, further comprising:
   modifying a cell measurement procedure based on the indication of the CCA failure received from the RAN node.

9. The method of claim 8, wherein modifying a cell measurement comprises performing at least one of:
   modifying radio link monitoring, beam management, cell change or power control, stopping or preventing a measurement based on the indication of the CCA failure indicating a plurality of failures, or stopping future cell measurements for a predetermined period of time.

10. The method of claim 9, further comprising resuming cell measurement from a last sample prior to stopping cell measurements.

11. The method of claim 1, wherein the indication of the CCA failure is received via at least one of: a Physical Broadcast Channel, PBCH, one or more payload bits outside a master information block, MIB, of a PBCH, a System Information Block, SIB, a single bit, and/or more than one bit.

12. The method of claim 1, wherein the indication of CCA failure comprises one or more of beam related information, information related to a direction of a beam, a number of CCA failures that have occurred, and/or a ratio of successful to failed CCA attempts.

13. The method of claim 1, wherein the wireless channel comprises one or more of unlicensed spectrum, shared spectrum, spectrum subject to a CCA procedure, spectrum subject to a listen before talk, LBT, procedure and/or spectrum for contention based operation.

14. A wireless device, comprising:
   processing circuitry; and
   memory coupled with the processing circuitry, wherein the memory includes instructions that when executed by the processing circuitry causes the wireless device to perform operations comprising:
      receiving a message from a radio access network, RAN, node serving the wireless device, the message comprising an indication of a failure of a clear channel assessment, CCA, procedure by the RAN node on a wireless channel wherein the indication of failure of the CCA procedure comprises a bitmap indicating locations of resources associated with CCA failure and locations of resources associated with CCA success; and
      adapting a serving cell procedure in response to the message wherein adapting the serving cell procedure comprises selectively filtering measurements based on the bitmap.

15. The wireless device of claim 14, wherein the memory includes instructions that when executed by the processing circuitry further causes the wireless device to establish a wireless connection with the RAN node using a wireless channel before receiving the message.

16. The wireless device of claim 14, wherein adapting the serving cell procedure comprises adapting monitoring and/or measurements on the wireless channel.

17. The wireless device of claim 14, wherein adapting the serving cell procedure comprises comparing the bitmap to a list of samples obtained over a measurement time interval and selectively excluding samples which were obtained based on contents of the bitmap.

18. The wireless device of claim 14, wherein adapting the serving cell procedure comprises adapting a radio link failure, RLF, declaration process, wherein adapting the RLF declaration process comprises performing at least one of:
   restarting or extending an RLF timer;
   suspending the RLF timer;
   restarting or extending an out-of-sync and/or in-sync evaluation period;
   resetting an out-of-sync and/or in-sync counter;
   changing a value of the out-of-sync counter to compensate for out-of-sync events that result from CCA failure at the RAN node;
   suspending the out-of-sync counter; and/or
   adapting a threshold for when out-of-sync events trigger a start of the RLF timer.

19. The wireless device of claim 14, wherein adapting the serving cell procedure comprises adapting a beam management procedure.

20. The wireless device of claim 19, wherein adapting the beam management procedure comprises performing at least one of:
   extending a beam failure detection evaluation time with respect to a reference signal evaluation time;
   restarting a beam failure detection process;
   restarting a candidate beam detection process;
   extending the candidate beam detection process;

adapting a threshold for triggering a beam failure detection or declaration;
adapting a threshold for triggering start of a timer for beam failure detection or declaration; and/or
postponing the candidate beam detection process.

21. The wireless device of claim 14, wherein the memory includes instructions that when executed by the processing circuitry further causes the wireless device to perform operations comprising:
modifying a cell measurement procedure based on the indication of the CCA failure received from the RAN node.

22. The wireless device of claim 21, wherein modifying a cell measurement comprises performing at least one of:
modifying radio link monitoring, beam management, cell change or power control,
stopping or preventing a measurement based on the indication of the CCA failure indicating a plurality of failures, or
stopping future cell measurements for a predetermined period of time.

23. The wireless device of claim 14, wherein the memory includes instructions that when executed by the processing circuitry further causes the wireless device to resume cell measurement from a last sample prior to stopping cell measurements.

24. The wireless device of claim 14, wherein the indication of the CCA failure is received via at least one of: a Physical Broadcast Channel, PBCH, one or more payload bits outside a master information block, MIB, of a PBCH, a System Information Block, SIB, a single bit, and/or more than one bit.

25. The wireless device of claim 14, wherein the indication of CCA failure comprises one or more of beam related information, information related to a direction of a beam, a number of CCA failures that have occurred, and/or a ratio of successful to failed CCA attempts.

26. The wireless device of claim 14, wherein the wireless channel comprises one or more of unlicensed spectrum, shared spectrum, spectrum subject to a CCA procedure, spectrum subject to a listen before talk, LBT, procedure and/or spectrum for contention based operation.

* * * * *